United States Patent
Yoneya et al.

(10) Patent No.: US 6,300,926 B1
(45) Date of Patent: Oct. 9, 2001

(54) ACTIVE MATRIX TYPE LIQUID CRYSTAL DISPLAY

(75) Inventors: Makoto Yoneya, Hitachinaka; Masuyuki Ohta, Mobara; Tsunenori Yamamoto; Makoto Tsumura, both of Hitachi; Masahiko Ando, Hitachinaka; Katsumi Kondo, Mito; Masahiro Ishii, Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/299,744

(22) Filed: Apr. 27, 1999

(30) Foreign Application Priority Data

Apr. 27, 1998 (JP) .................................................. 10-116452

(51) Int. Cl.$^7$ ....................................................... G02F 1/133
(52) U.S. Cl. .................................. 345/87; 345/92; 345/95; 345/98; 349/33; 349/56; 349/42; 349/141; 349/143; 349/139; 349/19; 349/187
(58) Field of Search ................................. 345/87, 92, 95, 345/98; 349/56, 19, 33, 42, 139, 141, 143, 187

(56) References Cited

U.S. PATENT DOCUMENTS 3,981,559 * 9/1976 Channin .................................. 349/33
5,786,876 * 7/1998 Ota et al. ................................ 349/42
5,914,761 * 6/1999 Ohe et al. ............................. 349/132
6,124,915 * 9/2000 Kondo et al. ......................... 349/141

* cited by examiner

Primary Examiner—Bipin Shalwala
Assistant Examiner—Vincent E. Kovalick
(74) Attorney, Agent, or Firm—Antonelli, Terry, Stout & Kraus, LLP

(57) ABSTRACT

There is provided an active matrix type liquid crystal display, which hardly generates display unevenness incident to electrode dimensional fluctuation caused by variations resulting from the electrode formation process, and which is excellent in mass producibility and in high image quality. An active matrix type liquid crystal display using the horizontal electric field system, wherein dimensional fluctuation in the active elements and the stored capacity formation portion, and finish dimensional fluctuation in the electrode for applying an electric field to the liquid crystal layer occur simultaneously, and variations in effective driving voltage caused by fluctuation in the active element dimension act in a direction to compensate for variations in the optical quality caused by dimensional fluctuation of the electrode for applying the electric field.

11 Claims, 18 Drawing Sheets

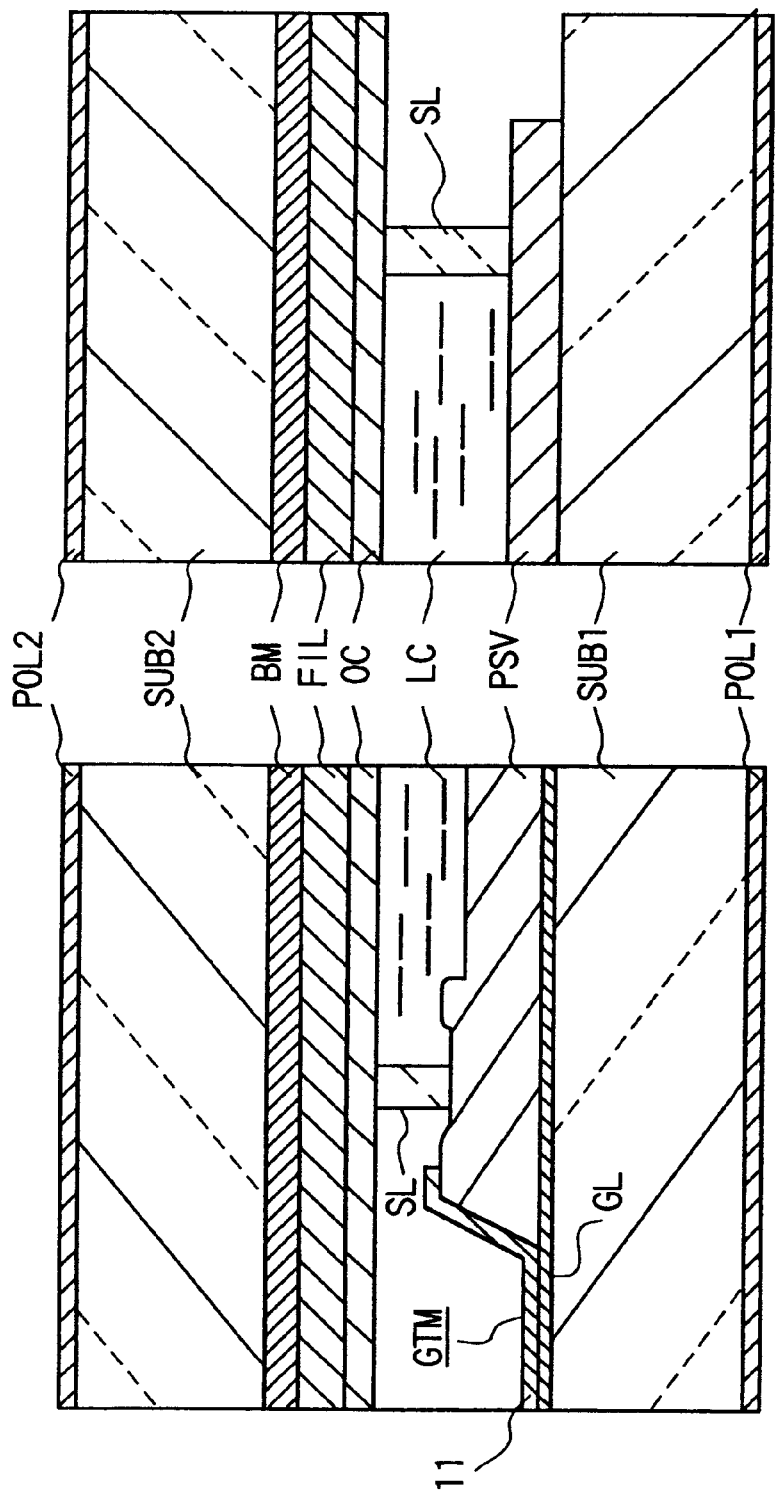

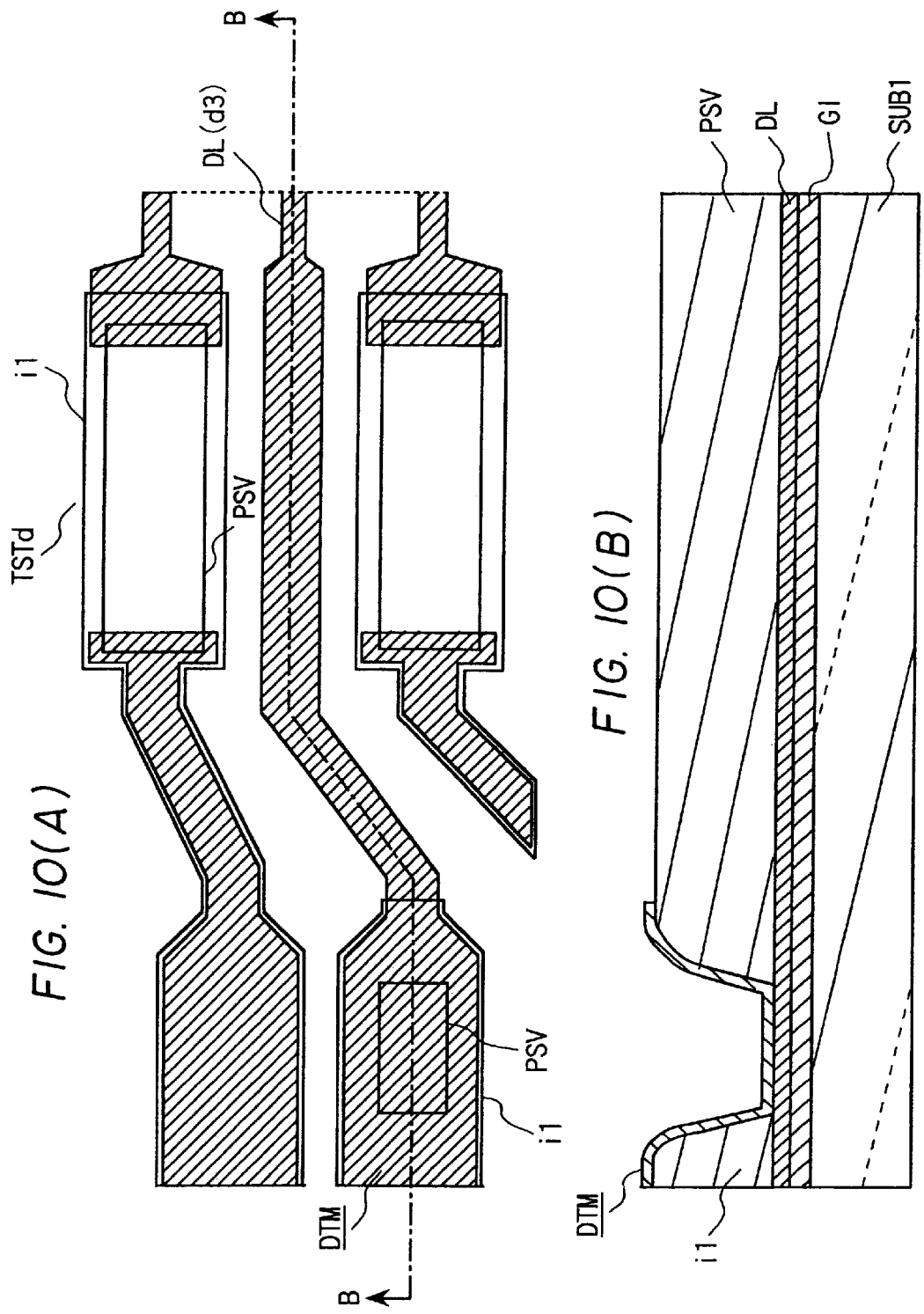

ACTIVE MATRIX TYPE LIQUID CRYSTAL DISPLAY

BACKGROUND OF THE INVENTION

The present invention relates to an active matrix type liquid crystal display using a horizontal electric field system.

As regards the display of information on a liquid crystal display (hereinafter, referred to as a LCD), an electric field is applied to liquid crystal (hereinafter, referred to as LC) molecules in a LC layer interposed between substrates to thereby change the direction of orientation of the LC molecules, and the display is obtained by a change in the optical quality of the LC layer resulting from the change in the direction of orientation of the LC molecules.

Particularly, an active matrix type LCD using active elements, which are represented by thin film transistor elements, has been employed as a display terminal of an OA apparatus having lower power consumption, by which the standard CRT will be replaced in terms of a response characteristic capable of coping with moving images at high precision and the like.

A conventional TN display system of the active matrix type LCD has a disadvantage in that it has a narrow visual field angle, which has posed a problem for the desired replacement of the standard CRT in terms of image quality.

On the other hand, a system (horizontal electric field system) for displaying information through the use of a change in double refraction properties of a LC by making the direction of an electric field to be applied to the LC, using comb-teeth electrodes, substantially parallel to the substrate surface, has been proposed, for example, in Japanese Patent Publication No. 63-21907 by "R. Kiefer, B. Weber, F. Windcheid and G. Baur, Proceedings of the Twelfth International Display Research Conference (Japan Display 192) pp. 547–550".

This horizontal electric field system has advantages, such as wider visual field angle, and lower loading capacity than the conventional TN system, and this technique offers hope as a full-fledged active matrix type LCD capable of replacing the standard CRT.

SUMMARY OF THE INVENTION

As regards how to apply an electric field to the LC, a vertical electric field is applied to a LC layer using solid (transparent) electrodes in the TN system, whereas a horizontal electric field is applied using striped comb-teeth electrodes in the horizontal electric field system. In the horizontal electric field system, since the electric field is applied using comb-teeth-shaped electrodes, there was a problem in that its characteristic property greatly fluctuates depending upon the electrode finish width in the manufacturing process.

More specifically, in a case where comb-teeth electrodes are formed by a conventional process, when the electrode width varies because of the photo-mask precision, exposure uniformity of photolithography and variations of etching, fluctuation in the electrode interval caused thereby causes variations in the horizontal electric field intensity even if the same voltage is applied between these electrodes, thus causing luminance unevenness on the display surface.

Further, as regards the electro-optic characteristic including threshold, in the TN system, the electro-optic characteristic does not directly depend upon the electrode interval (=thickness of LC layer) because the interval between a pair of electrodes which apply the electric field to the LC layer coincides with the thickness of the LC layer; whereas, in the horizontal electric field system, changes in the characteristic due to fluctuation of the electrode interval become great because the electro-optic characteristic directly depends thereon independently.

In the horizontal electric field system, therefore, when the comb-teeth electrode interval fluctuates owing to variations in the electrode finish width, a large shift occurs in the electro-optical characteristic curve, which mainly causes display luminance unevenness.

In order to solve this problem, a method to secure the above-described electrode finish precision by forming paired electrodes, which apply the horizontal electric field to the LC layer, in the same layer, and by dividing a display surface to combine a small-area high precision photo-process with a stepper, has been proposed by, for example, "Y. Matsutani, S. Tahata, M. Hayashi, T. Onawa, K. Kobayashi, K. Nagata and M. Morishita, (SID97 Digest) pp. 14 to 18". However, this method is inferior from the point of view of mass production of the display device because the divided photo-process using this stepper takes time, and this is considered to be a serious problem particularly when a large screen is increasingly used for the LCD in the future. As described above, the conventional horizontal electric field system active matrix type LCD has had a problem in that the electrode finish width is susceptible to the influence of the mass production process fluctuation, and surface luminance unevenness resulting from this fluctuation is prone to occur, resulting in inferior mass productivity.

It is an object of the present invention to provide an active matrix type LCD using the horizontal electric field system, which is excellent in mass producibility, in high image quality and which hardly causes display unevenness resulting from fluctuations in the electrode finish width.

According to the present invention, an attempt is made to solve the above-stated problems by causing other fluctuation factors at the same time which cancel and compensate for the effect of the electrode interval fluctuations to thereby reduce display luminance unevenness resulting from the electrode interval fluctuations in a horizontal electric field system of a LCD.

Hereinafter, the relationship between fluctuation factors, which cause display luminance unevenness in the horizontal electric field system, will be described.

In a translucent LCD element, a display luminance unevenness occurs because of unevenness in the transmission factor, and this is most easily recognized visually at a low transmission factor (relative transmission factor of 10% to 20%) corresponding to a low luminance. Since a transmission factor-voltage (T-V) characteristic in this low transmission factor area is considered to dominate the luminance fluctuation caused by a pixel electrode width fluctuation, we have considered a model in which the T-V characteristic in the low transmission factor area is linearly approximated. That is, the transmission factor-electric field (T-E) characteristic in the low transmission factor area is linearly approximated as follows:

$$T(E) = \alpha(E - Eth)$$

$$Eth = (\Pi/d)\sqrt{(K2/\Delta E)}$$

(Eth is threshold electric field, and is considered to be a constant here). When the horizontal electric field E is further approximated to E=V/1 using a pixel electrode interval 1, the transmission factor-voltage (T-V) characteristic can be expressed as follows:

$$T(V)=(\alpha/1)(V-Eth1)$$

In this respect, this T-V characteristic model can be considered to be a model obtained by tangent-approximating not only limited to the low transmission factor area, but at any arbitrary point.

From the above equation, fluctuation (ΔT) in the transmission factor due to minute fluctuation in each parameter is given by:

$$\Delta T = (\partial T/\partial V)\Delta v + (\partial T/\partial l)\Delta l + (\partial T/\partial \alpha)\Delta \alpha \quad (1)$$

$$= (\alpha/1)\Delta V - (\alpha V/1^2)\Delta l + ((V-V-Eth1)/1)\Delta \alpha$$

This is a sensitivity analysis equation for each fluctuation factor with respect to total transmission factor fluctuation ΔT. The Δ1 term is a term of fluctuation of the electrode interval 1 due to the pixel electrode width fluctuation which is the matter at issue now, and this becomes the main cause for the transmission factor fluctuation ΔT in the left side, causing the display luminance unevenness. As a method of reducing the transmission factor fluctuation ΔT to decrease the display luminance unevenness, a method can be considered for canceling the fluctuation among a plurality of terms which are factors for the transmission factor fluctuation. If, for example, the LC driving voltage V of the second term of the right side is increased (or decreased) with positive correlation with the electrode interval fluctuation in the first term at the same time, the respective fluctuations will be compensated by each other to reduce the total transmission factor fluctuation. This compensation condition can be expressed by the following equation:

$$(V/1)\Delta 1=\Delta V \quad (2)$$

The above equation represents a condition under which the effect of the drop (EΔ1~(V/1)Δ1) in the horizontal electric field applied to the LC layer due to an increase Δ1 in the pixel electrode interval in the left side is compensated for by a rise ΔV (the same with fluctuation in both in opposite directions) in the effective driving voltage on the right side.

It has been found that in order to compensate for the influence of such electrode interval fluctuation by the driving voltage fluctuation, it is necessary as a precondition to cause both the driving voltage fluctuation and the electrode interval fluctuation to simultaneously occur with a positive correlation therebetween.

A method for causing the above-described two fluctuations to simultaneously occur will be described with reference to the drawings.

FIG. 1 is a conceptual plan view showing one pixel on a thin film transistor (TFT: Thin Film Transistor) substrate side and its surrounding portion in an example of a horizontal electric field system active matrix type LC display element according to the present invention using TFT as an active element. FIG. 2 is a cross-sectional view taken on line 6—6 of FIG. 1. FIG. 3 is a cross-sectional view taken on line 7—7 of FIG. 1. FIG.4 is a cross-sectional view taken on line 8—8 of FIG. 1. As shown in these views, an active matrix type LCD according to the present invention is structured such that one of the common electrode-pixel electrodes, which apply a horizontal electric field to the LC as a pair, is formed as the same layer (SD layer) as the source/drain electrode at the top of this TFT. Also, as shown in FIG. 4, in accordance with the present invention, the charge storage capacity is formed by overlapping the common electrode and the pixel electrode, and the overlap area which determines this storage capacity value is structured to be determined by the pixel electrode side in the SD layer. According to the present invention, the electrodes in the SD layer are structured such that they are collectively, on the entire display surface, formed in an SD process with the same photo-mask. More specifically, according to the present invention, in a case where the electrode finish width of the SD layer fluctuates because of variations in photolithography or etching in the SD process, the LCD is structured such that the pixel common electrode interval, on which the horizontal electric field to be applied to the LC is dependent, the source/drain electrode dimensions, on which the TFT characteristic is dependent, and the overlap area of the pixel common electrode, which determines the storage capacity, simultaneously fluctuate with correlation to one another. With this structure, since the influence of the finish dimension fluctuation of the SD layer on the display characteristic becomes most significant as compared with dimensional fluctuations in the other layers, it is possible to restrain the greater part of the influence of the total electrode dimensional fluctuation by minimizing the influence of the dimensional fluctuation in the SD process.

In this respect, an electrode having the same layer as the TFT source/drain electrode is not restricted to the pixel electrode in the above-described example, but the common electrode, or the pixel electrode, or both of the common electrodes may be used. In any of these instances, the TFT source/drain electrode dimensions, the storage capacity portion dimension, and the pixel common electrode interval are determined by the same process (photo, etching process), whereby those dimensional fluctuations simultaneously occur with correlation to one another.

Against the background of the structure of the present invention, we have considered the compensation conditions for transmission factor fluctuation due to the electrode interval fluctuation. The electrode dimensional fluctuation in the SD process causes fluctuation in the effective driving voltage, and if it is exerted in a direction to compensate for the influence of the above-described electrode interval fluctuation, it is considered that as a result, the luminance (transmission factor) fluctuation based on the electrode finish dimensional fluctuation in the SD process can be reduced. Next, a method for causing such an effective driving voltage fluctuation as to cause the above-described compensation due to dimensional fluctuation in the SD process will be described.

As a mechanism in which the driving voltage varies by dimensional fluctuation in a TFT electrode and the like, as described above, a so-called feed through voltage is known. The feed through voltage refers to a drop in source potential caused by capacity division of a charge which has been maintained at the TFT parasitic capacity immediately after the TFT is turned off. This feed through voltage $\Delta V_S$ can be generally represented by the following equation if it is considered that the influence of recharging due to a delay in the gate pulse, which causes a difference in image quality between the center and both ends of the display surface, is restrained to some degree in the design and is ignored:

$$\Delta_{VS}=(1/Ctot)\{Cgson(V_{GH}-V_{GL})-\Delta Cgs(V_D-V_{GL})\} \quad (3)$$

$$Ctot=Cgsoff+Cstg+ClC$$

$$\Delta Cgs=Cgson-Cgsoff$$

where Cgson and Cgsoff are values of gate-source parasitic capacity during TFT-on or TFT-off, respectively, CLC and Cstg are values of pixel LC capacity and storage capacity, respectively, and $V_{GH}$, $V_{GL}$ and $V_D$ are high gate pulse potential, low gate pulse potential and drain potential, respectively.

From the above equations, it can be seen that the feed through voltage is dependent on the high gate pulse potential as viewed from the low gate pulse potential and the drain potential, and is determined by the gate-source parasitic capacity value Cgs of the TFT. As regards Cgs, assuming a Mayer model with a sufficiently high charging ratio ($V_{CS}-V_{TH}$>>$V_{DS}$) for the intrinsic parasitic capacity, and MIS type capacity for the overlap capacity, the gate-source parasitic capacity can be expressed as follows:

$$Cgson = (W_a Co/2) l_g$$

$$Cgsoff = \{(WCoCa)/(Co+Ca)\} l_s = \{(WCo)/2\}\{(Ca/(Co+Ca)\}(l_g-L)$$

where L and W are the TFT channel length and width (W is defined as the width of the source electrode which determines Cgsoff here) shown in the cross-sectional view 3 and the plan view 5 of the TFT portion, respectively, and $W_a$ is the width of an amorphous silicon (a-Si) layer which determines Cgson during TFT-on ($W_a$ is determined in the a-Si layer process and not in the SD process).

$l_s$ and $l_d$ are overlaps of the source-drain electrode on the gate electrode portion (width $l_g$), respectively, and it is assumed here that both are the same (accordingly, $L=l_g-2l_s$). Co and Ca are capacity per unit area of the gate insulating layer and the a-Si layer, respectively.

When we consider the relationship between TFT dimensional fluctuation and Cgs fluctuation in the SD process from the above equation, it can be seen that Cgson is not affected by the dimensional fluctuation in the SD process, whereas Cgsoff and ΔCgs vary depending upon the channel length L and width W to be determined in the SD process.

A description will be made of variations in the effective driving voltage which is caused by fluctuation in the TFT channel dimension. First, in the case of driving with the common electrode potential, whose conceptual driving wave-forms are shown in FIG. 6, fixed, we consider the effective voltage to be actually applied to the LC taking the feed through voltage into consideration. In the case of common-fixed driving, the drain potential is expressed by the following equation correspondingly to positive charging ($V_D^+$) and negative charging ($V_D^-$) of the video signal voltage $V_{stg}$.

$$V_D\pm = \pm V_{SIG} + V_{D-CENTER}$$

where, when the driving voltage, which becomes a peak transmission factor in the T-V characteristic of pixels, is set to $V_{MAX}$, the video signal voltage $V_{SIG}$ is inputted approximately within the following range:

$$0(\text{black display}) \leq V_{SIG} \leq V_{MAX}(\text{white display})$$

(In the horizontal electric field system, white and black in the TN system are reversed).

The LC driving effective value voltage Vlc varies as shown in the FIG. 6 Driving Voltage Wave-form Diagram through the feed through voltage, and is concretely expressed as follows:

$$V_{LC} = \sqrt{[\{(V_D^+ - \Delta V_S^+ - V_{COM})^2 + (V_D^- - \Delta_{COM})^2\}/2]}$$

where $\Delta V_S^+$ and $\Delta V_S^-$ are values of feed through voltage during positive and negative charging, respectively.

By substituting the equation of $V_D\pm$ and the following equation into the above equation, $$V_{COM} = V_{D-CENTER} - (\tfrac{1}{2})(\Delta V_S^+ + \Delta V_S^-)$$

$$V_{LC} = |V_{SIG} + (\tfrac{1}{2})(\Delta V_S^- - \Delta V_S^+)|$$

is given.

The second term in the right-hand side represents a change in the driving voltage by contribution of the feed through voltage, and the amount of change is a half of the difference in feed through voltage between that during positive charging and that during negative charging.

When the feed through voltage $\Delta V_S$ of the equation (3) and the above equation of $V_D\pm$ are substituted into the above equation, since $V_{LC}$ satisfies the relation of $V_{SIG} \geq 0$ and $\Delta Cgs \geq 0$, $$V_{LC} = V_{SIG}\{1 + (\Delta Cgs/Ctot)\}$$

is given.

From this equation, it can be seen that variations in driving voltage based on the feed through voltage in the case of a common-fixed driving are proportionate to $\Delta Cgs/Ctot$.

Next, we consider a case of common AC driving in which the common electrode potential has been converted into AC, which is frequently used as a method of providing the drain driver with low withstand voltage.

In the common AC driving, the common potential is, as its name indicates, converted into AC at voltage width $V_{CPP}$ with $V_{COMC}$ as the center as follows:

$$V_{COM}\pm = \pm(\tfrac{1}{2})V_{CPP} + V_{COMC}$$

where the center potential $V_{COMC}$ is given by the following same equation as the common fixation:

$$V_{COM} = V_{D-CENTER} - (\tfrac{1}{2})(\Delta V_S^+ \Delta V_S^-)$$

The drain potential at common AC can also be considered as the same shape as at common fixation:

$$V_D\pm = \pm V_{SIG} + V_{D-CENTER}$$

The video signal voltage $V_{SIG}$ in the case of common AC is deflected to the AC converted common potential including also the phase, and therefore, it is considered that $V_{SIG}$ can take either a positive or negative value, assuming that positive is antiphase to common and negative is in-phase.

In the case of causing it to correspond to the equation at a common fixation, it is to be deflected as a common potential amplitude $V_{CPP} = V_{MAX}$ within the following range:

$$-(\tfrac{1}{2})V_{MAX}(\text{black display}) \leq V_{SIG} \leq (\tfrac{1}{2})V_{MAX}(\text{white display})$$

That is, since $V_{SIG}$ can be deflected both positive and negative as shown in the above equation, the variation width (output width of drain driver) of the drain potential becomes a half of that at the common fixation, although the variation width of $V_{SIG}$ becomes the same $V_{MAX}$ as at common fixation.

In actual common AC driving, in order to further reduce the variation width of the drain potential, the voltage applied to the pixel is not deflected from 0V as described above, but is deflected from threshold $V_{TH}$ of the T-V characteristic of pixels.

In other words, by increasing the common potential amplitude by $V_{TH}$, we get $V_{CPP} = V_{MAX} + V_{TH}$. This portion, that is, $$-(\tfrac{1}{2})(V_{MAX} - V_{TH})(\text{black display}) \leq V_{SIG} \leq (\tfrac{1}{2})(V_{MAX} - V_{TH}) \text{ (white display)}$$

and the variation width of drain potential can be further decreased by $V_{TH}$ into $V_{MAX}-V_{TH}$.

After all, the effective value voltage $V_{LC}$ for LC driving at common AC is represented by:

$$V_{LC}=\sqrt{[\{(V_D^+-\Delta V_S^+-V_{COM-})^\wedge 2+((V_D^--\Delta V_S^-V_{COM+})^\wedge 2\}/2]}$$

By substituting the equations concerning the above-described $V_{COMC}$ and $V_D\pm$ the following equation can be obtained:

$$V_{LC}=(\tfrac{1}{2})|2V_{SIG}+V_{CPP}+V_S^-\Delta V_S^+|$$

As regards the feed through voltage during common AC driving, taking into consideration that the gate potential is also converted into AC by the foregoing equation of $\Delta V_s$ at common AC, $$\Delta V_S^+=(1/Ctot)\{Cgson(V_{GH}^--V_{GL}^-)-\Delta Cgs\,(V_D^+-V_{GL}^-)\}$$

$$\Delta V_S^-=(1/Ctot)\{Cgson(V_{GH}^+-V_{GL}^+)-\Delta Cgs\,(V_D^--V_{GL}^+)\}$$

are given.

By substituting the above equation into the equation of $V_{LC}$, the following equation is given:

$$V_{LC}=(\tfrac{1}{2})|2V_{SIG}+V_{CPP}+(Cgson/Ctot)\,(V_{GH}^+-V_{GL}^--V_{GH}^-+V_{GL}^-)\\+(\Delta Cgs/ctot)(V_D^+-V_D^-+V_{GL}^++V_{GL}^-)|$$

When it is considered that the gate low potential is AC converted in the same phase and in the same amplitude as the common potential and a gate pulse having amplitude $V_{CPP}$ is superposed thereon, the AC-conversion of the foregoing gate potential is represented by the following equations:

$$V_{GL}\pm=\pm(\tfrac{1}{2})V_{CPP}+V_{GLC}$$

$$V_{GH}\pm=V_{GPP}+V_{GL}\pm$$

That is, the gate pulse wave-form becomes a 4-value AC wave-form.

When these are substituted, the term Cgson disappears in the above equation of $V_{LC}$, and when the equation of $V_D\pm$ is further substituted, after all $V_{LC}$ is:

$$V_{LC}=V'_{SIG}\{1+(\Delta cgs/ctot)\}$$

and the following equation is given:

$$V'_{SIG}=V_{SIG}+V_{CPP}/2$$

Since $V'_{SIG}=V_{SIG}+V_{CPP}/2$ corresponds to the $V_{SIG}$ at common fixation in the above equation, this equation is considered to be equivalent to the corresponding equation at common fixation after all.

Accordingly, as regards effective driving voltage fluctuation caused by dimensional fluctuation in the SD process during common AC driving (hereinafter, called "full common AC driving") in which such gate pulses as described above for both low and high are AC converted in the same manner, it is considered to be the same as at common fixation in the preceding paragraph.

On the other hand, in the common AC driving actually used with the products, the gate low potential is AC-converted in almost all cases in the same manner as described above, but as regards the gate high potential, a method using a fixed gate pulse is used because the withstand voltage of the gate driver can be kept low and the circuit can be simplified.

In this case, the gate pulse wave-form is represented by the following equation:

$$V_{GL}\pm=\pm(\tfrac{1}{2})V_{CPP}+V_{GLC}$$

$$V_{GH}\pm=V_{GPP}$$

In other words, the gate high potential is not changed, but becomes constant by positive/negative charging, and the gate pulse wave-form becomes a 3-value AC wave-form.

When the foregoing gate pulse wave-form is substituted into the equation of $V_{LC}$, the Cgson term does not disappear, but remains in this case, and $V_{LC}$ is represented by the following equation:

$$V_{LC}=V'_{SIG}[1+(\Delta Cgs/Ctot)-(Cgson/Ctot)\{V_{CPP}/\,(2V_{SIG}+V_{CPP})$$

The Cgson term newly added in the above equation is caused by a difference (the same as in the case of the foregoing full common AC driving) in the falling width of the gate pulse during positive/negative charging.

Summarizing the foregoing results, the effective driving voltage for both common fixation and common AC driving is represented by the following equation generalized:

$$V_{LC}=V'_{SIG}\{1+(\Delta C'gs/Ctot)$$

In the common-fixed driving, $$V'_{SIG}=V_{SIG}, \Delta C'gs=Cgs$$

In the full common AC driving, in which both the gate low potential and the gate high potential have been AC-converted, $$V'_{SIG}=V_{SIG}+V_{CPP}/2$$

$$\Delta C'gs=\Delta Cgs$$

In the ordinary common AC driving, in which only the gate low potential has been AC-converted, $$V'_{SIG}=V_{SIG}+V_{CPP}/2$$

$$\Delta C'gs = \Delta Cgs - \{V_{CPP}/(2V_{SIG}+V_{CPP})\}Cgson$$

$$= (V_{SIG}/V_{SIG})Cgson - Cgsoff$$

are given.

In the ordinary common AC driving, in which only the gate low potential has been AC-converted (while $\Delta C'gs=\Delta Cgs>0$ in the common-fixed and full common AC driving), the last equation indicates that the effective value of $\Delta C'gs$ varies through the visual signal potential $V_{SIG}$ so that it may become $\Delta C'gs<0$ (at low luminance).

The means according to the present invention described so far will be re-confirmed here. A horizontal electric field system of the active matrix type LC display element according to the present invention is structured such that the TFT channel dimensions L, W, pixel electrode interval 1 and a stored capacity formation portion area S are formed by the same source/drain (SD) process, and the dimensional fluctuations due to fluctuation in the SD process condition occur with correlation to one another simultaneously Concretely, when an one-side retreat amount from the design value of a finish value for the pixel electrode width in the SD process is set to $\Delta 1$, the pixel electrode interval 1, which is an interval with the common electrode in the gate/common (GC) layer in FIG. 2, is to be changed by $\Delta 1$.

On the other hand, the one-side retreat amount $\Delta 1$ in the foregoing SD process causes a fluctuation of $\Delta L=2\Delta 1$ in the TFT channel length L and fluctuation of $\Delta W=-2\Delta 1$ in the channel width W when the contribution of both electrodes, source/drain, is taken into consideration.

Further, the electrode finish width fluctuation in the SD process causes a change (by Δl) of the LC pixel capacity Clc contained in Ctot in the equation of the effective driving voltage $V_{LC}$, and a change based on a change ΔS in the overlap area S of the storage capacity $C_{stg}$, which is formed by the overlap of the pixel/common electrodes, and a change in the effective driving voltage caused by them is given by the following equation:

$$\Delta V_{LC}(\Delta L, \Delta W, \Delta 1, \Delta S) = \partial V_{LC}/\partial L \Delta L + \partial V_{LC}/\partial W \Delta W + \partial V_{LC}/\partial 1 \Delta 1 + \partial V_{LC}/\partial S \Delta S$$

$$= \{(\partial \Delta C'gs/\partial L)(\partial V_{LC}/\partial \Delta C'gs + (\partial \Delta Ctot/\partial L)(\partial V_{LC}/\partial Ctot)\}(2\Delta 1 +$$

$$\{(\partial \Delta C'gs/\partial W)(\partial V_{LC}/\partial \Delta C'gs) + (\partial Ctot/\partial W)(\partial V_{LC}/\partial Ctot)\}(-2\Delta 1) + \{(\partial Ctot/\partial 1)(2V_{LC}/\partial Ctot)\}\Delta 1 + (\partial Ctot/\partial$$

$$S)(\partial V_{LC}/\partial Ctot)\}\{-2(1+A)1_{st}\}\Delta 1 = [(\partial \Delta C'gs/\partial L - \partial \Delta C'gs/\partial W)(\partial V_{LC}/\partial \Delta C'gs) + \{\partial Ctot/\partial L - \partial Ctot/\partial W + (½)$$

$$\partial Ctot/\partial 1 - (1+a)1_{st}(\partial Ctot/\partial S)\}(\partial V_{LC}/\partial Ctot)]2\Delta 1$$

In the above equation, we have considered that the shape of an electrode overlapped portion, which forms the storage capacity $C_{stg}$, is a rectangle having a short side $1_{st}$ and a long side a $1_{st}$ and set a change ΔS in the area of this portion due to the one-side retreat amount Δ1 to the following equation (the second term of Δ1 is ignored).

$$\Delta s = (1_{st} - 2\Delta 1)(a1_{st} - 2\Delta 1) - a_{1st}^{\ 2} \sim -2(1+a)1_{st}\Delta 1$$

When this equation is substituted into an equation (2) for compensation condition obtained by sensitivity analysis, $$V_{LC}/1 = 2[(\partial \Delta C'gs/\partial L - \partial \Delta C'gs/\partial W)(\partial V_{LC}/\partial \Delta C'gs)] + \{\partial Ctot/\partial L - Ctot/\partial W + (½)\partial Ctot/\partial 1 - (1+a)1_{st}(\partial Ctot/\partial S)\}(\partial V_{LC}/\partial Ctot)]$$

By evaluating each partial differential term in the above equation to rewrite it using $1_{tot}$ whose definition will be indicated later, the following equation can be obtained as an equation for a compensation condition after all:

$$(1/1)\{1+(\Delta C'gs/Ctot)\}=(1/Ctot)(Cgsoff/1_s+2Cgsoff/W+\Delta C'gs/1_{tot})(4)$$

The left-hand side of the above equation is a term for pixel electrode interval fluctuation while the right-hand side is a term for driving voltage fluctuation resulting from the feed through voltage, and the above equation indicates the condition on which these two contributions compensate for each other (within a range of minute fluctuation) so that total transmission factor fluctuation is apparently nullified.

Further, the physical meaning of each term of the above equation will be described. The first term on the left-hand side is a pixel electrode interval fluctuation term, and the second term is a correction term resulting from a change in the effective driving voltage due to the feed through voltage.

Since normally ΔC'gs<<Ctot, this correction term is an amount which can be substantially ignored as compared with the first term on the left-hand side.

On the other hand, as regards each term of the driving voltage fluctuation on the right-hand side, the first and second terms in the right-hand side are a contribution of changes in TFT channel length L and width W, respectively, the third term is a term for a change in off-state total loading capacity Ctot, and $1/1_{tot}$, which is a coefficient of the change, is defined by the following equation.

$$1/1_{tot}=(1/Ctot)[Cgsoff/1_s+2Cgsoff/W+Clc/1+2\{(1+a)/a\}Cstg/1_{st}]$$

Actually, the greater part of this term $1/1_{tot}$ is a fluctuation term for the storage capacity Cstg, which is the last term.

The coefficient of the fluctuation term (the last term on the right-hand side of the above equation) of this storage capacity is determined by a rate of change, per one-side retreat amount Al of the electrode, of the area S of the electrode overlapped portion, which forms the storage capacity:

$$(\Delta S/S)/\Delta 1 \sim -2(1+a)1_{st}/\{a1_{st}^{\ 2}\}=-2\{(1+a)/a\}/1_{st}$$

This coefficient (ΔS/S)/Δ1 varies depending upon the shape of the foregoing electrode overlapped portion.

We have considered a case where the shape of, for example, the storage capacity formation portion is changed and the long side of the foregoing rectangle is divided into N equal parts and separated to form a storage capacity.

In this case, the total area is not changed, but the storage capacity is to be formed by n rectangles each having an area $S'=1_{st}(a/N)1_{st}$.

In this case, the coefficient (ΔS/S)/Δ1 is given by:

$$(\Delta S/S)\Delta 1=\{N\Delta S'/(NS')\}/\Delta 1 = -N(1+a/N)1_{st}/(N(a/N)1_{st}^{\ 2})=-2\{1+(a/N)\}/\{(a/N)1_{st}\}$$

and it is found that the term Cstg remains unchanged, "a" can be apparently made larger by a portion which has become a/N, ΔS/S)/Δ1, and as a result, $1/1_{tot}$ can be made large by the shape effect of the storage capacity.

We have considered the foregoing compensation condition for each of the respective driving methods.

First, we have considered the full common AC driving in which both common fixation and gate high/low have been AC-converted. Since ΔC'gs=ΔCgs and ΔCgs>0, the three terms for driving voltage fluctuation on the right-hand side are all positive, and all always exert an effect in a direction to compensate for the image electrode interval fluctuation on the left-hand side.

Also, in the case of the common fixation and full common AC driving, the equation for compensation condition does not depend upon the driving voltage condition (actually the pixel capacity Clc in the Ctot has dependence on the driving voltage ClC ($V_{LC}$)) as a matter of form.

In the case of the common AC driving, in which only the gate low potential has been AC-converted, which is normally used, ΔC'gs contains a direct driving voltage parameter $V_{SIG}/V'_{SIG}$ unlike the above-described case, and therefore, it has a direct dependence on the image signal voltage.

From within the range of the video signal voltage during the foregoing common AC driving:

$$V_{CPP}=V_{MAX}+V_{TH}, -(½)(V_{MAX}-V_{TH})(\text{black display}) \leq V_{SIG} \leq (½)(V_{MAX}-V_{TH})(\text{white display}),$$

and $$V_{TH} \leq V_{SIG} \leq V_{MAX}$$

This parameter $V_{SIG}/V'_{SIG}$ has a negative value on the low transmission factor side, in which luminance unevenness poses a problem. In this case, therefore, the parameter $V_{SIG}/V'_{SIG}$ is given in the equation (4) for compensation condition, by the following equation on the right-hand side thereof:

$$\Delta C'gS=(V_{SIG}/V'_{SIG})Cgson-Cgsoff<0$$

Therefore, in the case of the ordinary common AC driving, since on the low transmission factor side, the third term (fluctuation term for total loading capacity) on the right-hand side of the above-described equation for compensation condition normally becomes a negative term with nearly the same magnitude as the first or second term on the right-hand side, it is considered that in most cases, the three terms in the right-hand side cancel one another out so that the total on the right-hand side does not become great enough to compensate for the influence of the pixel electrode interval fluctuation on the left-hand side, or that the entire right-hand side becomes negative so that it does not tend to compensate for the left-hand side, but to increase conversely.

At this time, the correction term for the electrode interval fluctuation term of the second term on the left-hand side also becomes negative, and exerts an influence in a direction to reduce the transmission factor fluctuation caused by its influence, but the effect of this correction term is relatively small as described above, and the influence of the above-described driving voltage compensation which does not effectively work is by far greater.

It has been found that the common AC driving normally used for the above-described reasons is more disadvantageous in principle than the common fixation and the full common AC driving in planning to enlarge the SD process dimensional fluctuation margin using the driving voltage compensation with the above-described structure.

Accordingly, with the structure according to the present invention described so far, the pixel electrode interval, the TFT channel dimension and the storage capacity portion dimension are simultaneously formed in the SD process. In a case where the electrode finish width fluctuates in the SD process, when the pixel-common electrode interval 1 on which the horizontal electric field to be applied to the LC is dependent, the TFT channel dimension on which the effective driving voltage is dependent, and the storage capacity portion area simultaneously fluctuate with correlation to one another, their driving methods are set to the full common AC driving in which the common-fixed driving or both high and low gate pulses have been AC-converted, whereby it is possible to cause a change in the effective driving voltage caused by dimensional fluctuation to necessarily act in a direction to compensate for a change in the optical quality caused by a dimensional change of the electrode to which the horizontal electric field is applied so that the compensation operation can be effectively and reliably performed.

On the basis of the compensation effect described above, when comparing display luminance unevenness in a case where low luminance (10 to 20% relative luminance of maximum luminance), in which display unevenness is most conspicuous, is displayed by causing the TFT to be normally on with the gate voltage on all of the display surface, or all-pixel TFT of a LCD according to the present invention equal to or higher than the threshold, with that in a case where the same luminance is displayed on the same entire display surface by temporally turning on/off the TFT in the same manner as an actual state of use, the display luminance unevenness can be more noticeably improved in the latter in which the compensation effect acts than in the former in which the compensation effect does not act.

After further studying various ways, it has been found that in order to obtain the same display uniformity for substantially the same conditions as the method for securing electrode finish dimension precision by a combination of small-area high precision photo-process described in the prior art using a stepper, the reduction ratio of the display luminance unevenness can be set to 20% or more.

According to the present invention as described above, there can be provided a horizontal electric field system active matrix LCD which is less influenced by the mass production process fluctuation of the electrode finish width, and in which display luminance unevenness resulting from this fluctuation will hardly occur, and which is excellent in mass producibility and in high image quality. FIG. 19 is a view illustrating the general structure of the present invention.

It is composed of a scanning electrode driving circuit 18 for driving a scanning electrode; a signal electrode driving circuit 19 for driving a signal electrode; a control circuit 17 for controlling the scanning electrode driving circuit 18 and the signal electrode driving circuit 19; a common electrode driving circuit 20 for driving a common electrode; and a LC panel portion 21. The LC display panel 21 is composed of thin film semiconductor (TFT); a LC capacity portion Clc; and a storage capacity portion Cstg at each intersection between a signal line for transmitting a signal by the control of the signal electrode driving circuit 19 and the scanning lines of the scanning electrode driving circuit 18.

BRIEF DESCRIPTION OF THE DRAWINGS

FIG. 8 is a cross-sectional view showing a gate signal terminal on the left side, and a panel edge portion without external connecting terminals on the right side;

FIG. 10(A) is a plan view and FIG. 10(B) is a cross-sectional view showing the vicinity of a connecting portion between a drain terminal DTM and a drain signal line DL;

DETAILED DESCRIPTION OF PREFERRED EMBODIMENTS

Figure 1:
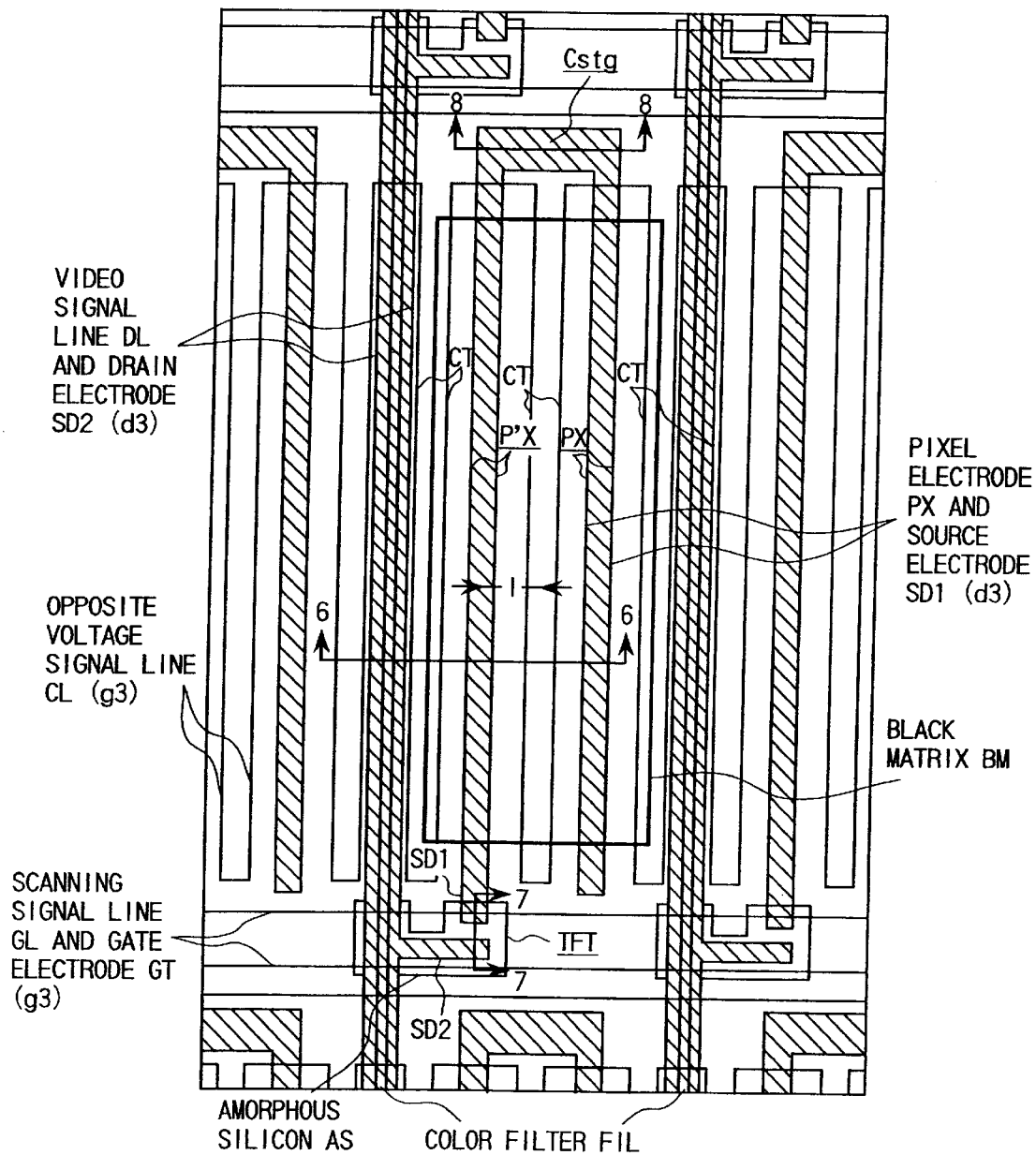
FIG. 1 is a partial plan view showing one pixel, and its surrounding portion, of a LC display portion in an active matrix type color LCD according to a first embodiment of the present invention.

Hereinafter, a description will be made of an embodiment in which the present invention is applied to an active matrix system color LCD. In this respect, in the following drawings to be described, those elements having the same function are designated by identical reference numerals and a repeated description thereof may be omitted.

(First Embodiment)

FIG. 1 is a plan view showing one pixel and its surrounding portions of an active matrix system color LCD of the present invention. As shown in FIG. 1, each pixel is arranged within an intersecting area (within an area enclosed by four signal lines) of a gate signal line (scanning signal line or horizontal signal line) GL, an opposed voltage wiring (common voltage signal line) CL and two adjacent drain signal lines (video signal line or vertical signal line) DL. Each pixel contains a thin film transistor TFT, a storage capacity Cstg, a pixel electrode PX and a common electrode CT. The gate signal line GL and the opposed voltage signal line CL extend in the lateral direction in the figure, and a plurality of lines are arranged in the vertical direction. The drain signal lines DL extend in the vertical direction, and a plurality of lines are arranged in the lateral direction. The pixel electrode PX is electrically connected to the thin film transistor TFT through the source electrode SD1, and the opposed electrode CT is also electrically connected to the opposed voltage signal line CL. The gate signal line GL is used to transmit a gate signal to the thin film transistor element of each pixel, the drain signal line DL is used to supply a drain signal voltage to the pixel electrode PX of each pixel through the thin film transistor element, and the common voltage signal line CL is used to supply a common voltage to the common electrode CT of each pixel.

The pixel electrode PX and the common electrode CT are opposed to each other, and an electric field substantially parallel to the substrate surface, which is generated between each pixel electrode PX and the common electrode CT, controls an optical state of the LC to control the display. The pixel electrode PX and the common electrode CT are constituted in a comb-teeth shape to become long and slender electrodes in the vertical direction in the figure.

In the present embodiment, the number of common electrodes CT within one pixel is three, and the number of pixel electrodes PX is two. However, their numbers are not restricted to these, but the number 0 (number of comb teeth) of the common electrodes CT within one pixel and the number P (number of comb teeth) of the pixel electrodes PX can be constituted so that the relation of 0=P+1 is satisfied.

In this respect, the electrode interval between the pixel electrode PX and the common electrode CT is changed depending upon the LC material being used. This is because, since the electric field intensity, which attains the maximum transmission factor, differs depending upon the LC material, the electrode interval is determined in response to the LC material, and the maximum transmission factor can be obtained within a range of the maximum amplitude of signal voltage which is set by the withstand voltage in the drain signal driving circuit (signal-side driver).

Figure 2:
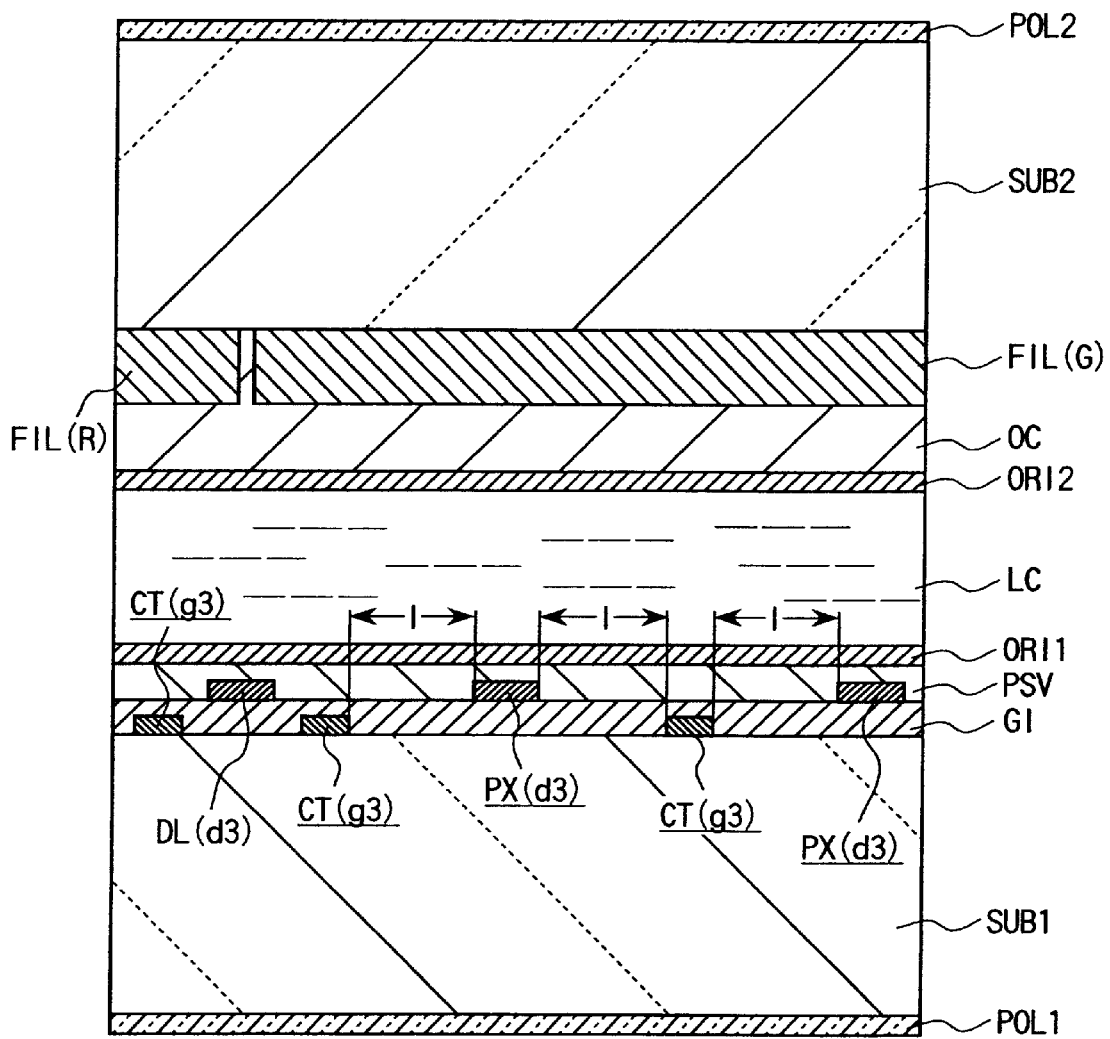
FIG. 2 is a cross-sectional view showing a pixel taken on line 6—6 of FIG. 1.
Figure 3:
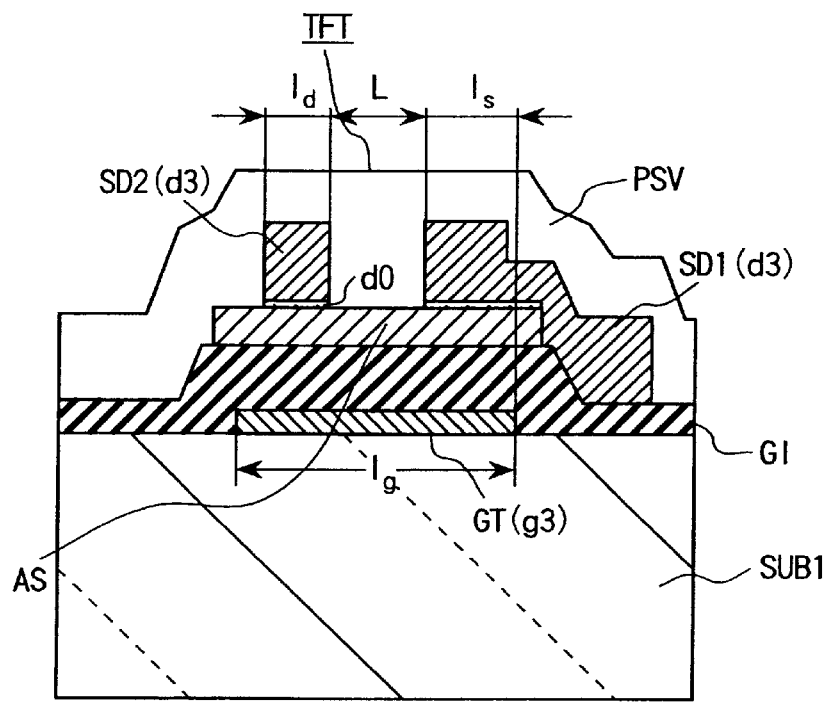
FIG. 3 is a cross-sectional view showing a thin film transistor element TFT taken on line 7—7 of FIG. 1.
Figure 4:
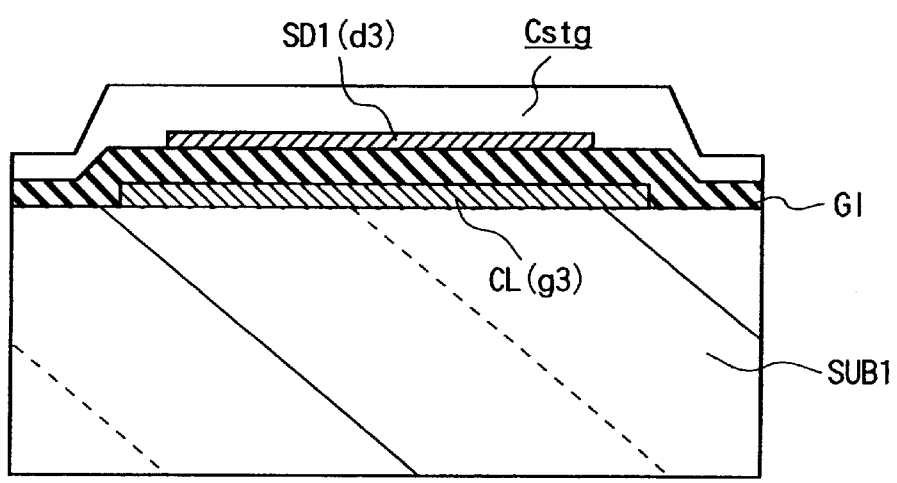
FIG. 4 is a cross-sectional view showing stored capacity Cstg taken on line 8—8 of FIG. 1.

As shown in FIGS. 2 to 4, with reference to the LC composition layer LC, the thin film transistor TFT, the storage capacity Cstg and an electrode group are formed on the side of the lower transparent glass substrate SUB1, and the color filter FIL and a light-shielding black matrix pattern BM are formed on the side of the upper transparent glass substrate SUB2.

On the surface of the respective inside (LC side) of the transparent glass substrates SUB1, SUB2, there are provided an orientation film ORI1, ORI2 for controlling the initial orientation of the LC, and on the surface of the respective outside of the transparent glass substrates SUB1, SUB2, there are provided polarizing plates POL1, POL2.

First, a detailed description will be made of the structure of the lower transparent glass substrate SUB1 side (TFT substrate).

The thin film transistor TFT operates such that when a positive bias is applied to the gate electrode GT, the source-drain channel resistance becomes smaller, and when the bias is reduced to 0, the channel resistance becomes greater.

The thin film transistor TFT has, as shown in FIG. 3, an i type semiconductor layer AS consisting of gate electrodes GT, an insulating film GI, "i" type (intrinsic conductive decisive impurity is not doped) amorphous silicon (Si), and a pair of a source electrode SD1 and a drain electrode SD2. In this respect, the source/drain are originally determined by a bias polarity therebetween, and the polarity is reversed during operation in the circuit of this LCD. Therefore, the source/drain replace each other during operation. For the sake of simplicity in the following description, they are expressed by fixing one as the source and the other as the drain.

The gate electrode GT is formed so as to continue to the gate signal line GL, and is constituted such that a part of the region of the gate signal line GL belongs to the gate electrode GT. The gate electrode GT is a part beyond the active region of the thin film transistor TFT. In this example, the gate electrode GT is formed by a single layer of conductive film g3. For the conductive film g3, chrome-molybdenum alloy (Cr—Mo) film formed by, for example, sputtering is used, but the conductive film is not restricted thereto. Also, two layers of different types of metal may be formed.

The gate signal line GL is constituted by conductive film g3. The conductive film g3 of this gate signal line GL is formed in the same manufacturing process as the conductive film g3 of the gate electrode GT, and is integrally constituted. Through this gate signal line GL, gate voltage Vg is supplied to the gate electrode GT from an external circuit. In this example, for the conductive film g3, chrome-molybdenum alloy (Cr—Mo) film formed by, for example, sputtering is used. Also, the gate signal line GL and the gate electrode GT are not restricted to only a chrome-molybdenum alloy, but, for example, in order to provide low resistance, a two-layer structure comprising aluminum or aluminum alloy wrapped in chrome-molybdenum may be adopted. Further, a portion, which intersects the drain signal line DL, is made small to reduce the probability of short-circuit with the drain signal line DL, and it may be forked into two branches so that it can be cut off by a laser trimming cutter even if short-circuited.

The opposed voltage signal line CL is constituted by conductive film g3. The conductive film g3 of this opposed voltage signal line CL is formed in the same manufacturing process as the conductive film g3 of the gate electrode GT, the gate signal line GL and the common electrode CT, and is integrally formed with the common electrode CT.

Through this opposed voltage signal line CL common voltage $V_{COM}$ is supplied to the common electrode CT from an external circuit. Also, the opposed voltage signal line CL is not restricted to only a chrome-molybdenum alloy, but, for example, in order to provide low resistance, a two-layer structure comprising aluminum or an aluminum alloy wrapped in chrome-molybdenum may be adopted. Further, a portion, which intersects the drain signal line DL, is made small to reduce the probability of a short-circuit with the drain signal line DL, and it may be forked into two branches so that it can be cut off by a laser trimming cutter even if short-circuited.

The insulating film GI is, in a thin film transistor TFT, used as a gate insulating film to impart an electric field to the semiconductor layer AS together with the gate electrode GT. The insulating film GI is formed on the upper layer of the gate electrode GT and the gate signal line GL. For the insulating film GI, a silicon nitride film formed by, for example, plasma CVD is selected, and is formed to a thickness of 2000 to 4500 Å (in the present embodiment, about 3500 Å). The insulating film GI is also used as an interlaminar insulating film for the gate signal line GL, the opposed voltage signal line CL and the drain signal line DL, and contributes to their electric insulation.

The "i" type semiconductor layer AS is of amorphous silicon, and is formed to a thickness of 150 to 2500 Å (in the present embodiment, film thickness of about 1200 Å). A layer do is a N(+) type amorphous silicon semiconductor layer obtained by doping phosphorus (P) for ohmic contact, and is interposed between the "i" type semiconductor layer AS on the lower side and the conductive layer d3 on the upper side.

The "i" type semiconductor layer AS and the layer d0 are also provided between both cross-over portions, which are between the gate signal line GL and the opposed voltage signal line CL, and the drain signal line DL. The "i" type semiconductor layer AS at the cross-over portion reduces the possibility of a short-circuit between the gate signal line GL and the opposed voltage signal line CL at the cross-over portion, and the drain signal line DL.

Each of the source electrode SD1 and the drain electrode SD2 is constituted by conductive film d3 which is in contact with the N(+) type semiconductor layer d0.

The conductive film d3 is formed to a thickness of 500 to 3000 Å (in the present embodiment, about 2500 Å) using a chrome-molybdenum alloy (Cr—Mo) film formed by sputtering. Since it is subjected to low stress, the Cr—Mo film can be formed to have a comparatively large film thickness, which contributes to a wiring with low resistance. The Cr—Mo film has excellent adhesive properties with the N(+) type semiconductor layer d0. For the conductive film d3, a high-melting point metal (Mo, Ti, Ta, W) film and a high-melting point metal silicide ($MOSi_2$, $TiSi_2$, $TaSi_2$, $WSi_2$) film may be used in addition to the Cr—mo film, and a laminated structure with aluminum or the like may be adopted.

The drain signal line DL is constituted by the same layer of conductive film d3 as the source electrode SD1 and the drain electrode SD2. The drain signal line DL is integrally formed with the drain electrode SD2. In this example, the conductive film d3 is formed to a thickness of 500 to 3000 Å (in the present embodiment, about 2500 Å) using a chrome-molybdenum alloy (Cr—Mo) film formed by sputtering. Since it is subjected to low stress, the Cr—Mo film can be formed to have a comparatively large film thickness, which contributes to a wiring with low resistance. The Cr—Mo film has excellent adhesive properties with the N(+) type semiconductor layer d0. For the conductive film d3, a high-melting point metal (Mo, Ti, Ta, W) film and a high-melting point metal silicide ($MOSi_2$, $TiSi_2$, $TaSi_2$, $WSi_2$) film may be used in addition to the Cr—mo film, and a laminated structure with aluminum or the like may be adopted.

Figure 5:
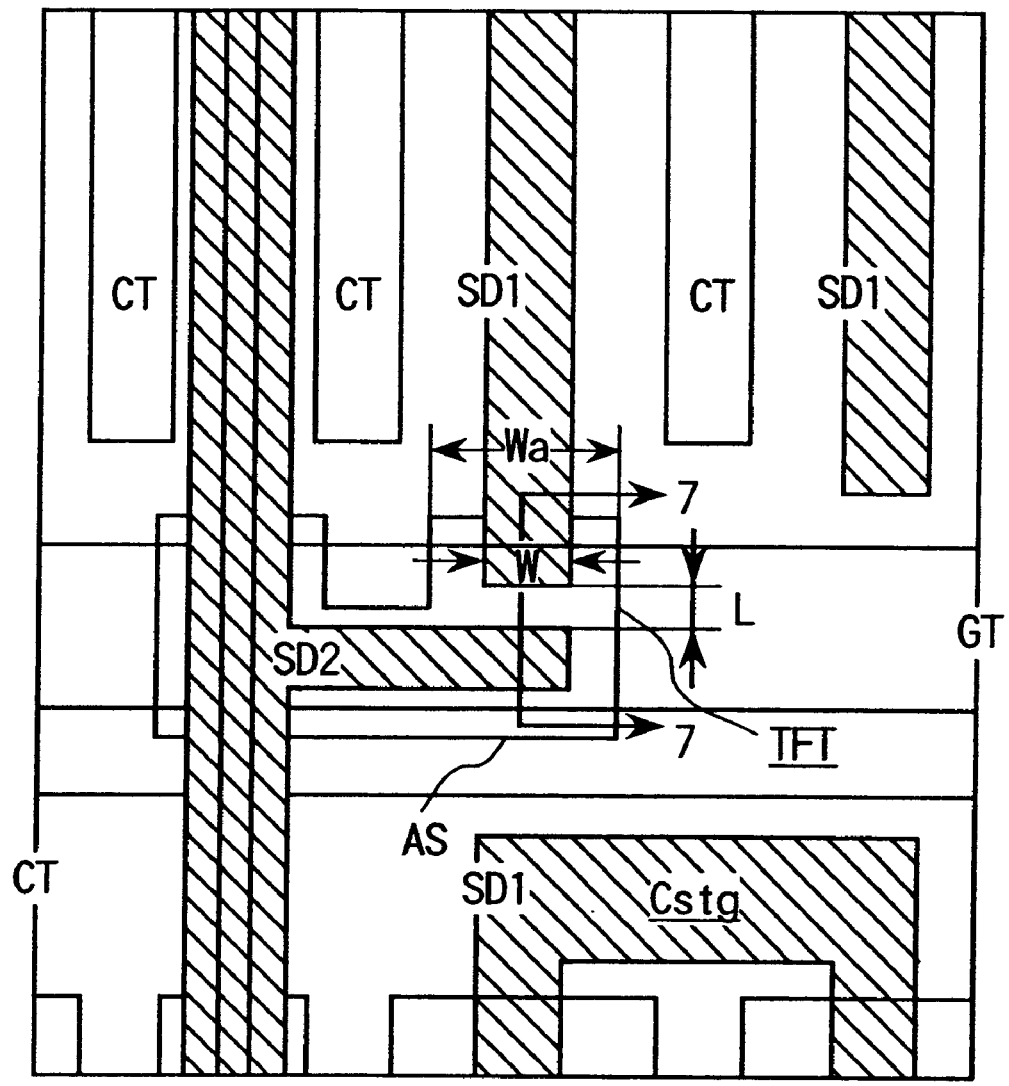
FIG. 5 is an enlarged plan view showing a surrounding portion of the thin film transistor element TFT of FIG. 1.

The conductive film d3, which forms the storage capacity Cstg, is formed to overlap the opposed voltage signal line CL in the source electrode SD1 portion of the thin film transistor TFT. This overlap is, as will be clear from FIG. 5, formed in the same manufacturing process with the source electrode SD1 (d3) as one electrode, and is integrally formed with the pixel electrode PX to constitute the storage capacity (electrostatic capacity element) Cstg having a common voltage signal CL as the other electrode. The dielectric film of this storage capacity Cstg is constituted by the insulating film GI which is used as the gate insulating film for the thin film transistor TFT.

As shown in FIG. 1, the storage capacity Cstg is formed on a part of the opposed voltage signal line CL as viewed plane-wise.

A protective film PSV1 is provided on the thin film transistor TFT. The protective film PSV1 is formed to mainly protect the thin film transistor TFT from humidity and the like, and a protective film having high transparence and yet excellent humidity resistance is used. The protective film PSV1 is formed by a silicon oxide film or silicon nitride film which is formed by, for example, a plasma CVD apparatus, and is formed to have thickness of 0.1 to about 1 µm.

The protective film PSV1 is removed so as to expose the external connecting terminals DTM, GTM. As regards the relationship in thickness between protective film PSV1 and insulating film GI, the former is made thicker in consideration of the protection effect, while the latter is made thinner in consideration of the mutual conductance of the transistor.

Also, it may be possible to adopt a laminated structure with a thick film constituted by an organic film such as polyimide for the protective film PSV1.

The pixel electrode PX is formed in the same manufacturing process as the source electrode SD1, and is also integrally formed with the source electrode SD1, and the conductive film d3 of a storage capacity formation portion.

The common electrode CT is integrally formed with the opposed voltage signal line CL.

The common electrode CT is constituted such that common voltage $V_{COM}$ is applied thereto. In the present embodiment, the common voltage $V_{COM}$ is set to a potential lower by feed through voltage $\Delta Vs$, which occurs when the thin film transistor element TFT is set to the off state, than an intermediate DC potential between driving voltage $V_{DMIN}$ at the minimum level to be applied to the drain signal line DL and the driving voltage $V_{DMAX}$ at the maximum level.

This common potential is made to have a constant potential temporally in order to exhibit an effect of compensating for the influence of dimensional fluctuation according to the present invention.

Reverting to FIGS. 1 and 2, a detailed description will be made of the structure of the upper transparent glass substrate SUB2 side (color filter substrate).

On the side of the upper transparent glass substrate SUB2, a light shielding film BM (so-called black matrix) is formed like the BM borderline shown in FIG. 1 so as to prevent transmission light from a unnecessary gap portion (gap other than between pixel electrode PX and common electrode CT) from emitting on the display surface side to deteriorate the contrast ratio or the like. The light-shielding film BM also plays a role to prevent external light or back light from being incident on the "i" type semiconductor layer AS. More specifically, the "i" type semiconductor layer AS of the thin film transistor TFT is sandwiched between the light-shielding film BM and a slightly large gate electrode GT, which are located on the upper and lower sides thereof, respectively, so that the layer AS is not exposed to external natural light or the back light.

The light-shielding film BM, as shown in FIG. 1, indicates only one pixel, but is formed such that the inside is opened for each of all pixels. This pattern is an example. In a portion of the comb-teeth electrode at the end portion in which the electric field direction is disturbed, the display for the portion corresponds to video information within the pixel in a one-to-one relationship, and since black is displayed if black, and white is displayed if white, it can be utilized as a part of the display.

However, the light-shielding film BM must have shielding properties against light. Particularly, the gap between the pixel electrode PX and the common electrode CT requires an optical density of 3 or higher in order to suppress crosstalk (longitudinal smear) in the drain signal line direction. It may be formed by metal having an electrical conductivity, such as Cr, and it is preferably formed by a film having a high level of insulation characteristics so as not to affect the electric field between the pixel electrode PX and the common electrode CT. In the present embodiment, the film is formed to a thickness of about 1.2 $\mu$m by mixing black organic pigment with resist material.

Also, in order to improve the shielding properties against light, carbon or titanium oxide (TixOy) may be mixed within such a range as to be able to maintain 108 $\Omega$cm or more at which the insulation characteristics do not affect the electric field within the LC composition layer.

The light-shielding film BM also plays a role to make the contour of pixels of each line clear because effective display areas for each line are partitioned thereon.

The light-shielding film BM is formed in a picture-frame shape also at the surrounding portion, and is formed such that its pattern continues to the pattern of the matrix portion shown in FIG. 1. The light-shielding film BM at the surrounding portion extends outside a sealed portion SL to prevent leakage light of reflected light or the like resulting from a packaged apparatus such as a personal computer from entering the matrix portion, and also to prevent light such as back light from leaking outside the display area. On the other hand, this light-shielding film BM rests about 0.3 to 1.0 mm inside the edge of the substrate SUB2, and is formed so as to avoid the cut area of the substrate SUB2.

A color filter FIL is formed in a stripe-shape with red-green-blue repeated in a position opposed to the pixel. The color filter FIL is formed so as to overlap the light-shielding film BM portion.

The color filter FIL can be formed as follows: First, dyeing base material such as an acrylic resin is formed on the surface of the upper transparent glass substitute SUB2, and dyeing base material other than a red filter formation area is removed by the photolithography technique. Thereafter, the dyeing base material is colored with red pigment, and a fixing process is performed to form a red filter R. By performing a similar process, a green filter G and a blue filter B are formed in order. In this respect, dye may be used for dyeing.

An overcoat film OC is provided in order to prevent dye of the color filter FIL from leaking to LC composition layer LC, and to flatten a difference in level due to the color filter FIL and the light-shielding film BM. The overcoat film OC is formed by a transparent resin material such as, for example, an acrylic resin and epoxy resin. Also, as the overcoat film OC, an organic film of polyimide or the like, which is excellent in fluidity may be used.

Next, a description will be made of the LC layer, orientation film, a polarizing plate and the like.

As the LC composition, there is used a nematic LC having a positive dielectric constant anisotropism $\Delta\epsilon$ of 13.2 and a refractive index anisotropism $\Delta$n of 0.081 (589 nm, 20° C.). The thickness (gap) of the LC composition layer is 3.8 $\mu$m, and the retardation $\Delta$n.d is 0.31 $\mu$m. This value for retardation $\Delta$n.d is set within a range of 0.25 $\mu$m and over to 0.35 $\mu$m incl. preferably within a range of 0.28 $\mu$m and over to 0.32 $\mu$m incl. When the orientation film and a polarizing plate to be described later are combined and the LC molecules are rotated 45° in the electric field direction from the initial orientation direction, it is possible to obtain the maximum transmission factor, and to obtain transmission light having hardly any dependency on wavelength within the range of visible light.

The thickness (gap) of the LC composition layer is controlled by a polymer bead subjected to a vertical orientation process. This control stabilizes the orientation of the LC molecules around the bead when black is displayed, thus obtaining an excellent black level, and improving the contrast ratio.

In this respect, the LC material is not particularly restricted, but the dielectric constant anisotropism $\Delta\epsilon$ may be negative. The higher the dielectric constant anisotropism $\Delta\epsilon$, the more the driving voltage can be lowered, and the lower the refractive index anisotropism An, the more the thickness (gap) of the LC layer can be increased, the filling time for LC can be shortened, and variations in gap can be reduced.

As regards the resistivity of the LC composition, a composition having resistivity of 109 $\Omega$cm and over to 1014 $\Omega$cm incl., preferably 1011 $\Omega$cm and over to 1013 $\Omega$cm incl. is used. In this system, even if the resistance of the LC composition is low, voltage charged between the pixel electrode and the common electrode can be sufficiently maintained, and its lower limit is 109 $\Omega$cm, preferably 1011 $\Omega$cm. This is based on the fact that the pixel electrode and the common electrode are constituted on the same substrate. Also, since it is difficult to lessen the static electricity which enters the manufacturing process when the resistance is too high, the lower limit is 1014 $\Omega$cm or less, preferably 1013 $\Omega$cm or less.

Figure 18:
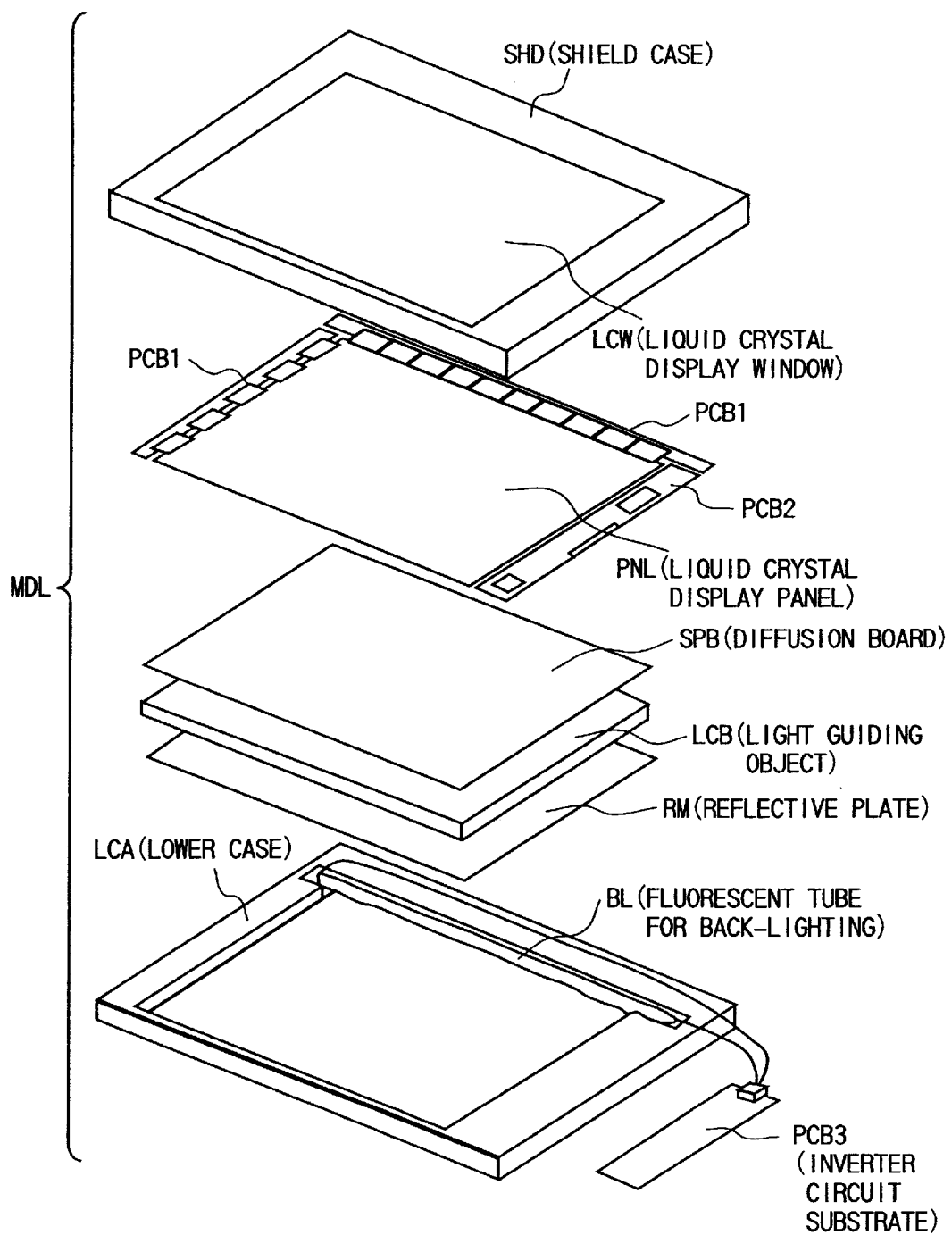
FIG. 18 is an exploded perspective view showing a LC display module.
Figure 19:
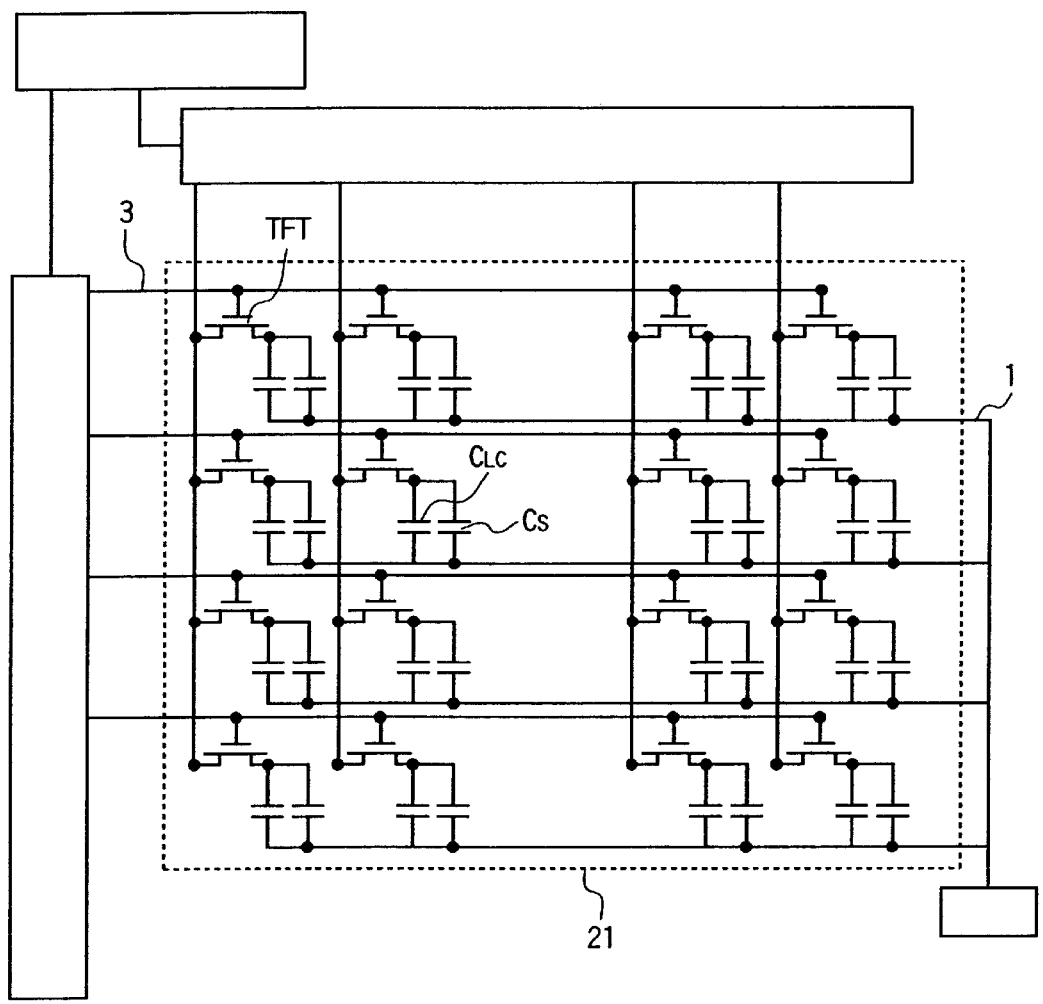
FIG. 19 is a schematic diagram showing the general structure of the present invention.

For the orientation film OR1, a polyimide is used. The initial orientation directions RDR in the upper and lower substrates are made parallel to each other. As a method for imparting the initial orientation direction, rubbing is most generally used, but there is an oblique deposition in addition. FIG. 18 shows the relationship between the initial orientation direction RDR and the applied electric field direction EDR. In the present embodiment, the initial orientation direction RDR is about 75° with respect to the horizontal direction.

In this respect, the angle made by the initial orientation direction RDR and the applied electric field direction EDR must be 45° C. and over to 90° C. excl. if the dielectric constant anisotropism $\Delta\epsilon$ of the LC material is positive, and must be over 0° C. and to 45° C. incl. if the dielectric constant anisotropism $\Delta\epsilon$ is negative.

For the polarizing plate POL, a polarizing plate having an electrical conductivity is used, the polarizing transmitting shaft MAX1 of the lower polarizing plate POLL is caused to coincide with the initial orientation direction RDR, and the polarizing transmitting shaft MAX2 of the upper polarizing plate POL2 is caused to orthogonally intersect it. FIG. 18 shows this relationship. This provides a normally close characteristic in which the transmission factor is increased as the voltage (voltage between pixel electrode PX and common electrode CT) to be applied to the pixel according to the present invention is increased, and a good quality of black display can be performed when no voltage is applied.

In this respect, in the present embodiment, countermeasures against a defective display due to static electricity from outside and EMI are taken by causing the polarizing plate to have an electrical conductivity. As regards the electrical conductivity, if the countermeasures are taken only against the influence caused by static electricity, the seat resistance is $108\Omega/\square$ or less, or preferably $104\Omega/\square$ or less if countermeasures are taken against EMI. Also, the back (surface onto which the polarizing plate is adhered) of the surface of the LC composition sandwiched between the glass substrates may be provided with a conductive layer.

Figure 7:
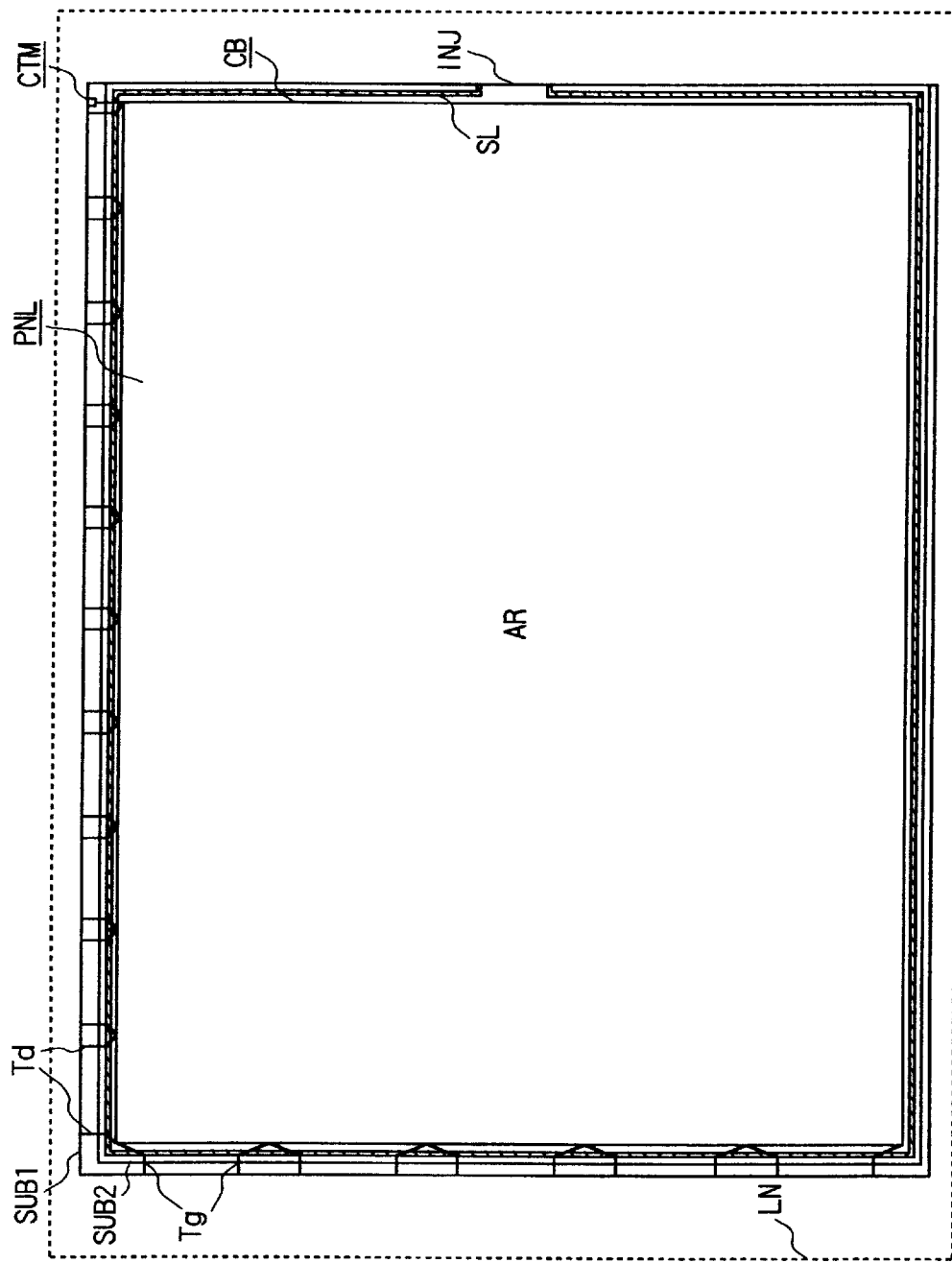
FIG. 7 is a plan view illustrating the structure of a matrix surrounding portion of a display panel.

FIG. 7 is a view showing an essential plane around the matrix (AR) of a display panel PNL including upper and lower glass substrates SUB1, SUB2. FIG. 8 is a view showing a cross-section of the vicinity of the gate terminal GTM to which a scanning circuit should be connected on the left side and the vicinity of a seal portion in which there is no external connecting terminal on the right side.

In the manufacture of the panel, for a small size, a plurality of devices are simultaneously produced with a sheet of glass substrate and thereafter are divided in order to improve the throughput. For a large size, a glass substrate of a size which has been standardized for any type in order to share the use of the manufacturing plant, is processed and thereafter, is reduced to respective sizes suitable for each type. In either case, after a series of processes, the glass is cut off. FIGS. 7 and 8 show the latter example, and both figures show state after the upper and lower substrates SUB1, SUB2 are cut off. LN indicates the edge before both substrates are cut off. In either case, in the completed state, as regards a portion (upper side and left side in the figure) where external connecting terminal group Tg, Td and terminal COT (numerical subscript omitted) exist, the size of the upper substrate SUB2 is restricted inside the lower substrate SUB1 so as to expose the portion. As regards terminal group Tg, Td, a plurality of pieces of the gate terminal GTM, the drain terminal DTM and their drawn wiring portions, which are to be described later, are brought together in units of a tape carrier package TCP on which an integrated circuit chip CHI is mounted, and are called "terminal group Tg, Td". The drawn wiring from the matrix portion in each group to the external connecting terminal portion is inclined as both ends are approached.

This is because terminals DTM, GTM of the display panel PNL are matched with the arrangement pitch of the package TCP and the connecting terminal pitch in each package TCP. The common electrode terminal COT is a terminal through which a common voltage is imparted to the common electrode CT from an external circuit. The opposed voltage signal line CL of the matrix portion is drawn out on the opposite side (right side in the figure) of the gate terminal GTM, and each common voltage signal line is collected by the common bus line CB to be connected to the common electrode terminal COT.

Between the transparent glass substrates SUB1 and SUB2, a seal pattern SL is formed so as to seal the LC except for the LC filling port INJ along their edges. The sealing material is made of, for example, epoxy resin.

The layers of the orientation film ORI1, ORI2 are formed inside the seal pattern SL. The polarizing plates POL1, POL2 are constituted on the surface outside of the lower transparent glass substrate SUB1 and the upper transparent glass substrate SUB2, respectively. The LC is encapsulated in an area partitioned by the seal pattern SL between the lower orientation film ORI1 and the upper orientation film ORI2 which set the direction of the LC molecules. The lower orientation film ORI1 is formed at the top of the protective film PSV1 on the side of the lower transparent glass substrate SUB1.

This LCD is assembled such that various layers are stacked separately on the side of the lower transparent glass substrate SUB1, and on the side of the upper transparent glass substrate SUB2, the seal pattern SL is formed on the substrate SUB2 side, the upper transparent glass substrate SUB2 is superimposed on the lower transparent glass substrate SUB2, the LC is injected from an opening INJ of the seal material SL, an injection port INJ is sealed with epoxy resin or the like, and the upper and lower substrates are cut off.

Figure 9A:
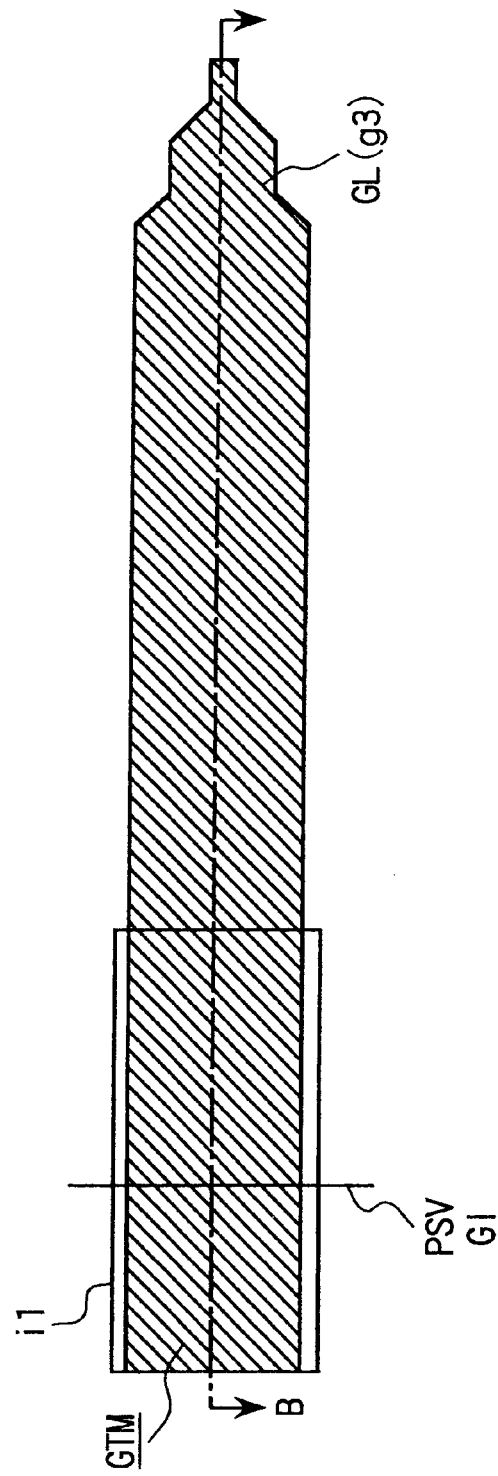
FIG. 9(A) is a plan view and FIG. 9(B) is a cross-sectional view showing the vicinity of a connecting portion between a gate terminal GTM and gate wiring GL.
Figure 9B:
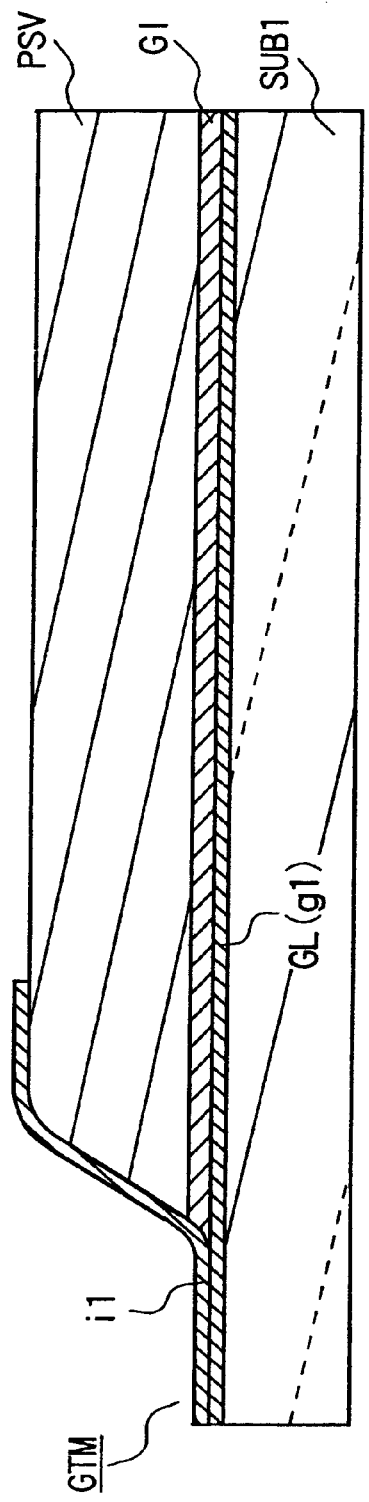

FIGS. 9(A) and 9(B) are views showing the connection construction from the gate signal line GL of display matrix to its external connecting terminal GTM, wherein FIG. 9(A) is a plan view and FIG. 9(B) is a cross-sectional view taken on line B—B of FIG. 9(A). In this respect, FIG. 9(A) corresponds to the lower portion of FIG. 7, and the portion of oblique wiring is represented by a straight line for convenience' sake.

In the figure, the Cr—Mo layer g3 is hatched for the sake of understanding.

The gate terminal GTM is composed of the Cr—Mo layer g3, and a transparent conductive layer i1, which further protects the surface of the Cr—Mo layer g3 and improves the reliability of connection with the TCP (Tape Carrier Package). This transparent conductive layer i1 employs a transparent conductive film ITO.

In FIG. 9(A), the insulating film GI and the protective film PSV1 are formed on the right side of their borderline, and the terminal portion GTM located at the left end is exposed from them so as to enable electric contact with an external circuit. In FIG. 9(B), only a pair of the gate line GL and the gate terminal are shown, but actually a plurality of such pairs are arranged in the upper and lower sides to constitute the terminal group Tg, the left end of the gate terminal is, in the manufacturing process, extended beyond the cut area of the substrate, and is short-circuited through wiring SHg (not shown). This is useful to prevent electrostatic destruction during rubbing of the orientation film ORI1 in the manufacturing process, and the like.

FIGS. 10(A) and 10(B) are views showing connection from the drain signal line DL to its external connecting terminal DTM, wherein FIG. 10(A) is the plan view and FIG. 10(B) is a cross-sectional view taken on line B—B of FIG. 10(A). In this respect, FIG. 10(A) corresponds to the upper right portion of FIG. 7, and the right end direction corresponds to the upper end portion of the substrate SUB1 although the direction of FIG. 10(A) is changed for the convenience' sake.

TSTD is an inspection terminal, and no external circuit is connected thereto, but it is widened more than the wiring portion so as to allow a probe or the like to contact it. Likewise, the drain terminal DTM also is widened more than the wiring portion so as to allow an external circuit to connect thereto. The external connecting drain terminal DTM is arranged in the up-and-down direction, and the drain terminal DTM constitutes the terminal group Td (numerical subscript omitted) as shown in FIG. 7. The drain terminal DTM is further extended beyond the cut line of the substrate SUB1, and all of it is short-circuited with each other through the wiring SHd (not shown) in order to prevent electrostatic destruction during manufacturing process. The inspection terminal TSTD is formed into the drain signal line DL every other line as shown in FIG. 10(A).

The drain connecting terminal DTM is formed by the transparent conductive layer i1, and a portion with the protective film PSV1 removed is connected to the drain signal line DL. This transparent conductive film il employs the transparent conductive film ITO as in the case of the gate terminal GTM.

The drawn wiring from the matrix portion to the drain terminal portion DTM is constituted by the same level of layer d3 as the drain signal line DL.

Figure 11A:
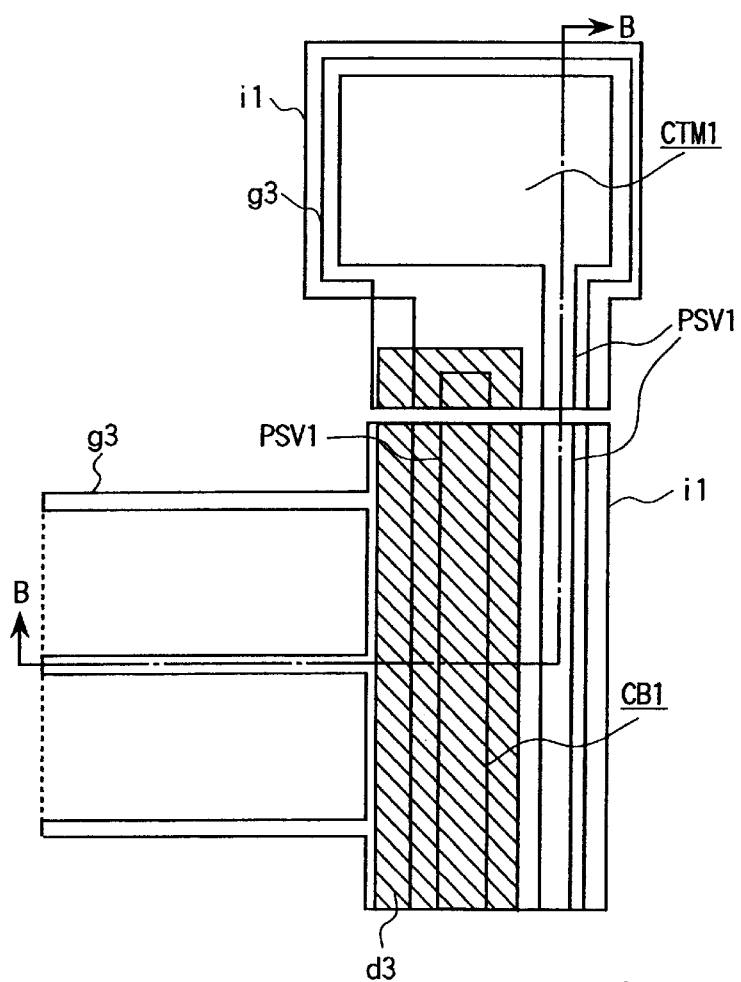
FIG. 11(A) is a plan view and FIG. 11(B) is a cross-sectional view showing the vicinity of connecting portions between a common electrode terminal CTM1, common bus line CB1 and common voltage signal line CL.
Figure 11B:
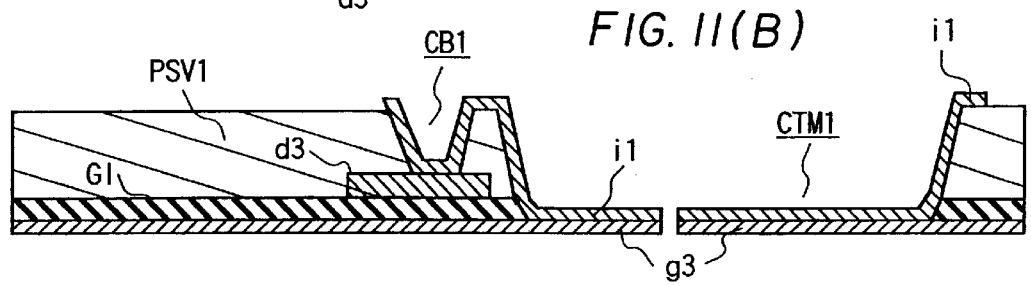

FIGS. 11(A) and 11(B) area views showing connection from the opposed voltage signal line CL to its external connecting terminal CTM, wherein FIG. 11(A) is the plan view and FIG. 11(B) is a cross-sectional view taken on line B—B of FIG. 11(A). In this respect, FIG. 11(A) corresponds to the upper left portion of FIG. 5.

Each opposed voltage signal line CL is brought together by a common bus line CB1 to be drawn out to the common electrode terminal CTM. The common bus line CB1 is structured such that a conductive layer 3 is stacked on a conductive layer g3 and they are electrically connected by the transparent conductive layer i1. This is because an attempt is made to reduce the resistance of the common bus line CB and to sufficiently supply a common voltage to each opposed voltage signal line CL from an external circuit. This structure is characterized by the fact that the resistance of the common bus line can be lowered particularly without adding any new conductive layer.

The common electrode terminal CTM is structured such that the transparent conductive layer il is stacked on the conductive layer g3 This transparent conductive layer i1 employs the transparent conductive film ITO as in the case of other terminals. In order to protect the surface of the conductive layer g3 and to prevent electric corrosion and the like, the conductive layer g3 is covered with a transparent conductive layer i1 having excellent durability. As regards connection between the transparent conductive layer i1, the conductive layer g3 and the conductive layer d3 the protective film PSV1 and the insulating film GI are formed with through-holes for conduction.

Figure 12A:
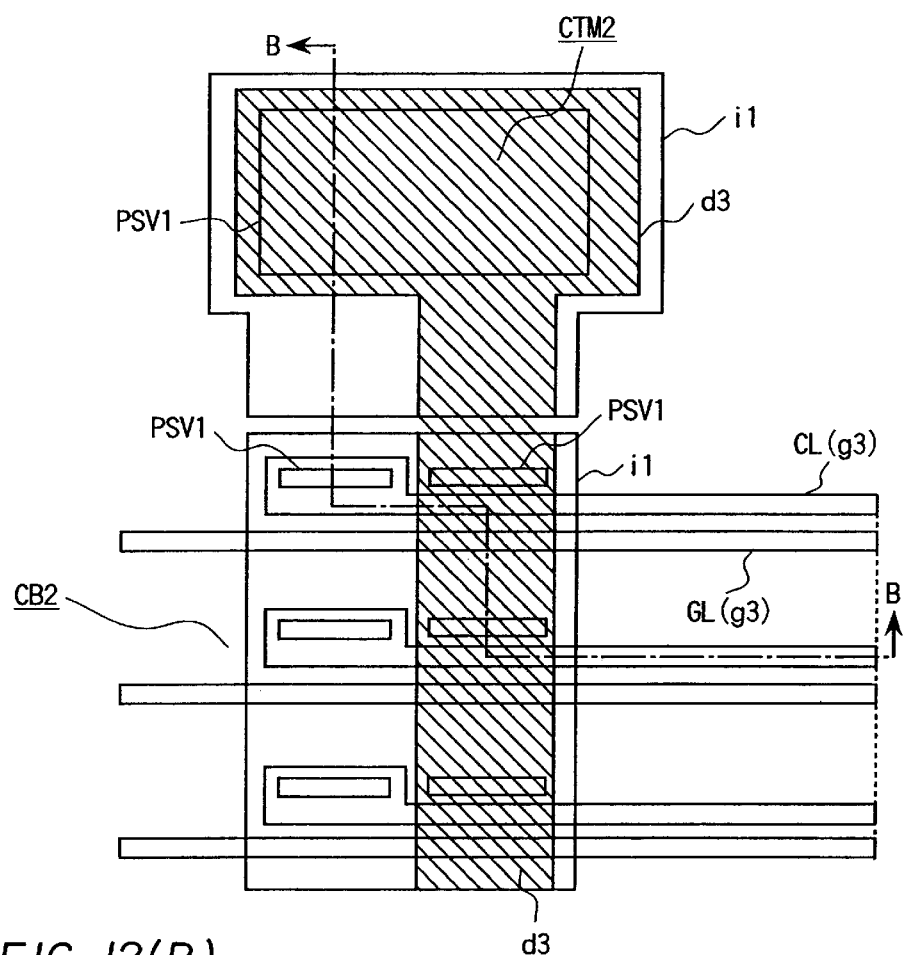
FIG. 12(A) is a plan view and FIG. 12(B) is a cross-sectional view showing the vicinity of connecting portions between a common electrode terminal CTM2, common bus line CB2 and common voltage signal line CL.
Figure 12B:
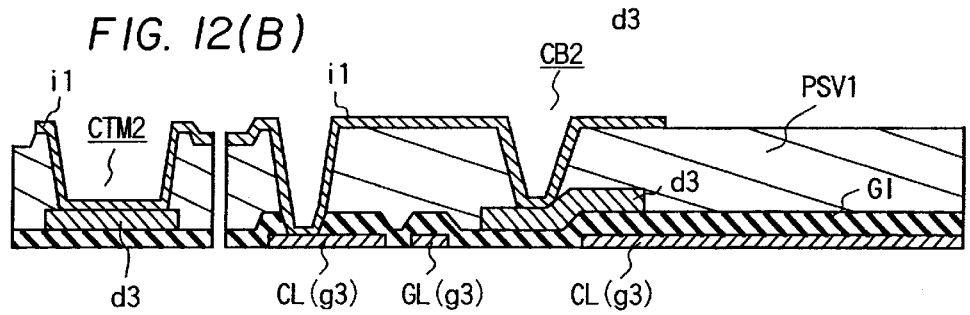

On the other hand, FIGS. 12(A) and 12(B) are views showing connection from the other end of the opposed voltage signal line CL to its external connecting terminal CTM2, wherein FIG. 12(A) is a plan view and FIG. 12(B) is a cross-sectional view taken on line B—B of FIG. 12(A). In this respect, FIG. 12(A) corresponds to the upper right portion of FIG. 5. At the common bus line CB2, each opposed voltage signal line CL is brought together at the other end (gate terminal GTM side) to be drawn out to the common electrode terminal CTM2. It is different from the common bus line CB1 in that it is formed by the conductive layer d3 and the transparent conductive layer i1 so as to be insulated from the gate signal line GL. It is insulated from the gate signal line GL by the insulating film GI.

Figure 13:
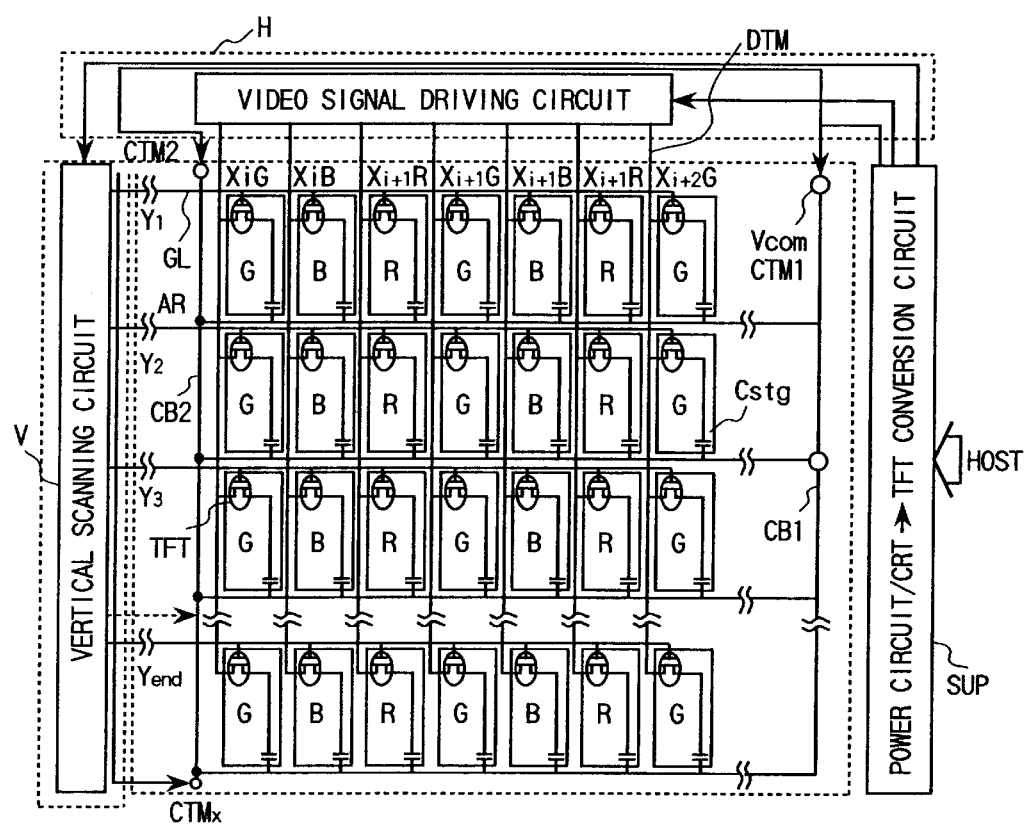
FIG. 13 is a circuit diagram showing a matrix portion and its surrounding portion of the active matrix type color LCD according to the present invention.

FIG. 13 shows an equivalent circuit for the display matrix portion and a connection diagram for its peripheral circuit. FIG. 13 is a circuit diagram, but is drawn to the actual geometrical arrangement. AR designates a matrix array in which a plurality of pixels are two-dimensionally arranged.

In FIG. 13, X designates a drain signal line DL, and subscripts G, B and R are added to green, blue and red pixels, respectively. Y designates a gate signal line GL, and subscripts 1, 2, 3, . . . , and end are added in accordance with the order of the scanning timing.

A gate signal line Y (subscript omitted) is connected to a vertical scanning circuit V, and a drain signal line X (subscript omitted) is connected to a drain signal driving circuit H.

SUP designates a circuit including a power circuit for obtaining plural stabilized voltage sources voltage-divided from one voltage source, and a circuit for exchanging information for CRT (Cathode Ray Tube) from a host (host processor) with information for TFT LCD.

Figure 6:
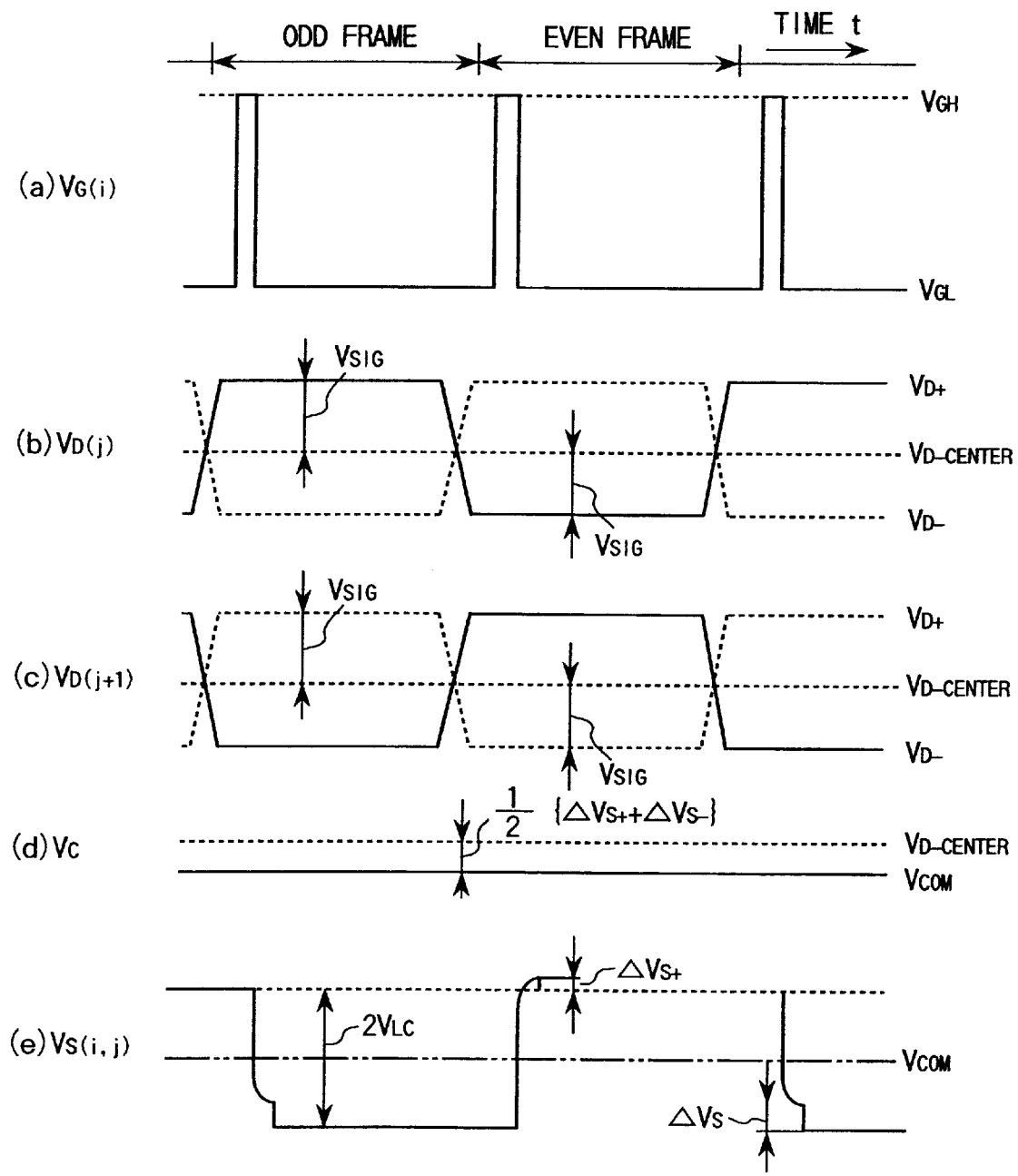
FIG. 6 is a waveform diagram showing an example of the driving wave-form in an active matrix type color LCD according to the present invention.

FIG. 6 shows driving the wave-form in a LCD according to the present embodiment. The common voltage $V_{COM}$ is set to a fixed potential temporally in order to exhibit a dimensional compensation effect according to the present invention.

A gate signal $V_G$ takes the on-level every one scanning period, and others take the off-level. The drain signal voltage is applied such that it is transmitted to one pixel by reversing the positive electrode and negative electrode every one frame with an amplitude twice as much as the voltage to be applied onto the LC layer. In this case, the drain signal voltage $V_D$ reverses in polarity every one column, and reverses in polarity every two lines. This provides a structure (dot inversion driving) in which pixels, whose polarity has been reversed, adjoin each other left, right, up or down, thereby making it difficult for flicker or crosstalk (smear) to be generated. The common voltage $V_{COM}$ is set to a voltage which is a fixed amount lower than center voltage of inversion of drain signal voltage.

This compensates for the feed through voltage which is generated when the thin film transistor element changes from on to off, and operates to apply an AC voltage having few DC components to the LC (because after images, deterioration or the like becomes heavy when DC is applied to LC).

Figure 14:
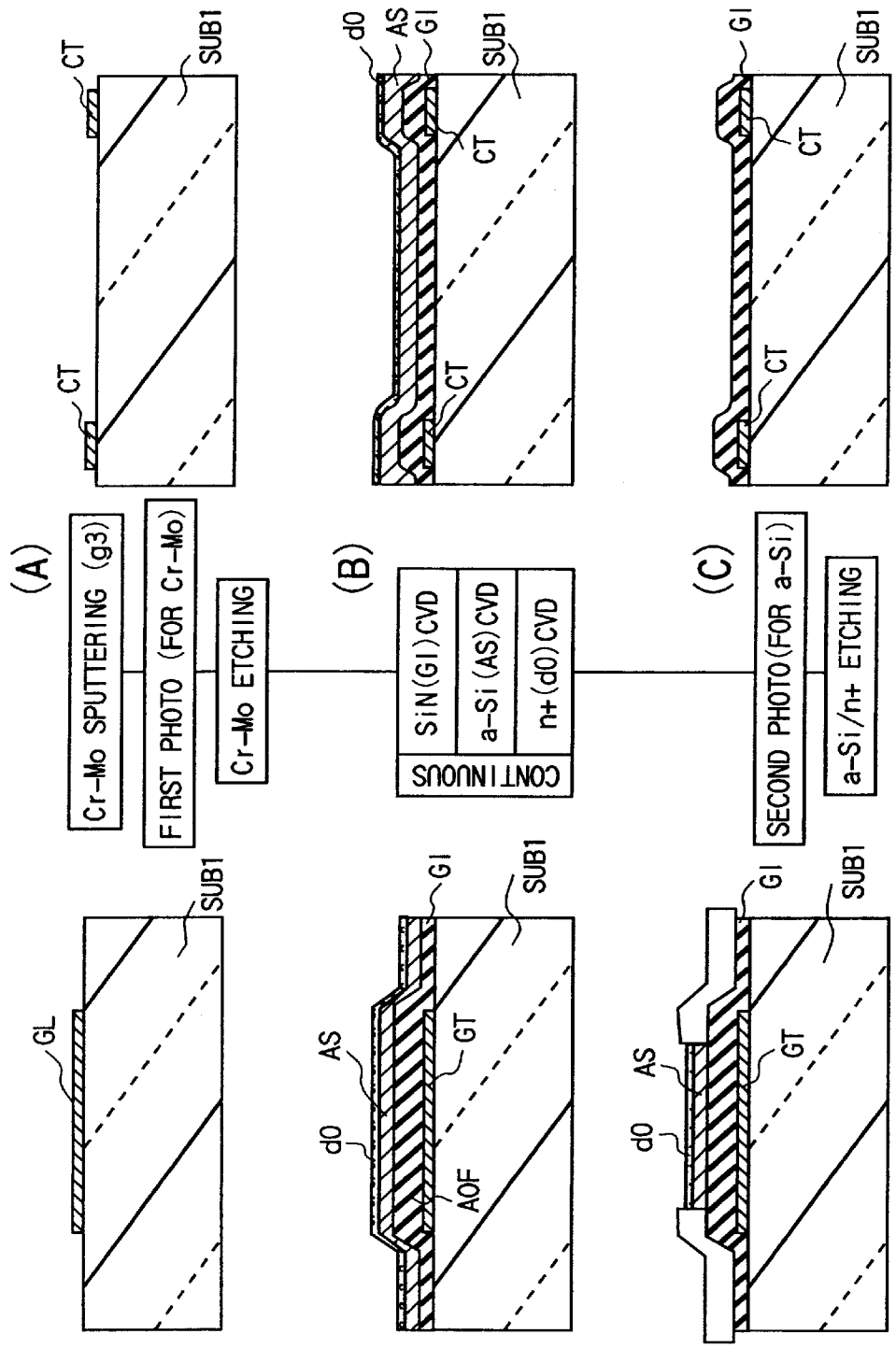
FIG. 14 is a part of a flow chart in a cross-sectional view for a pixel portion and a gate terminal portion showing manufacturing processes A to C on the substrate SUB1 side.
Figure 15:
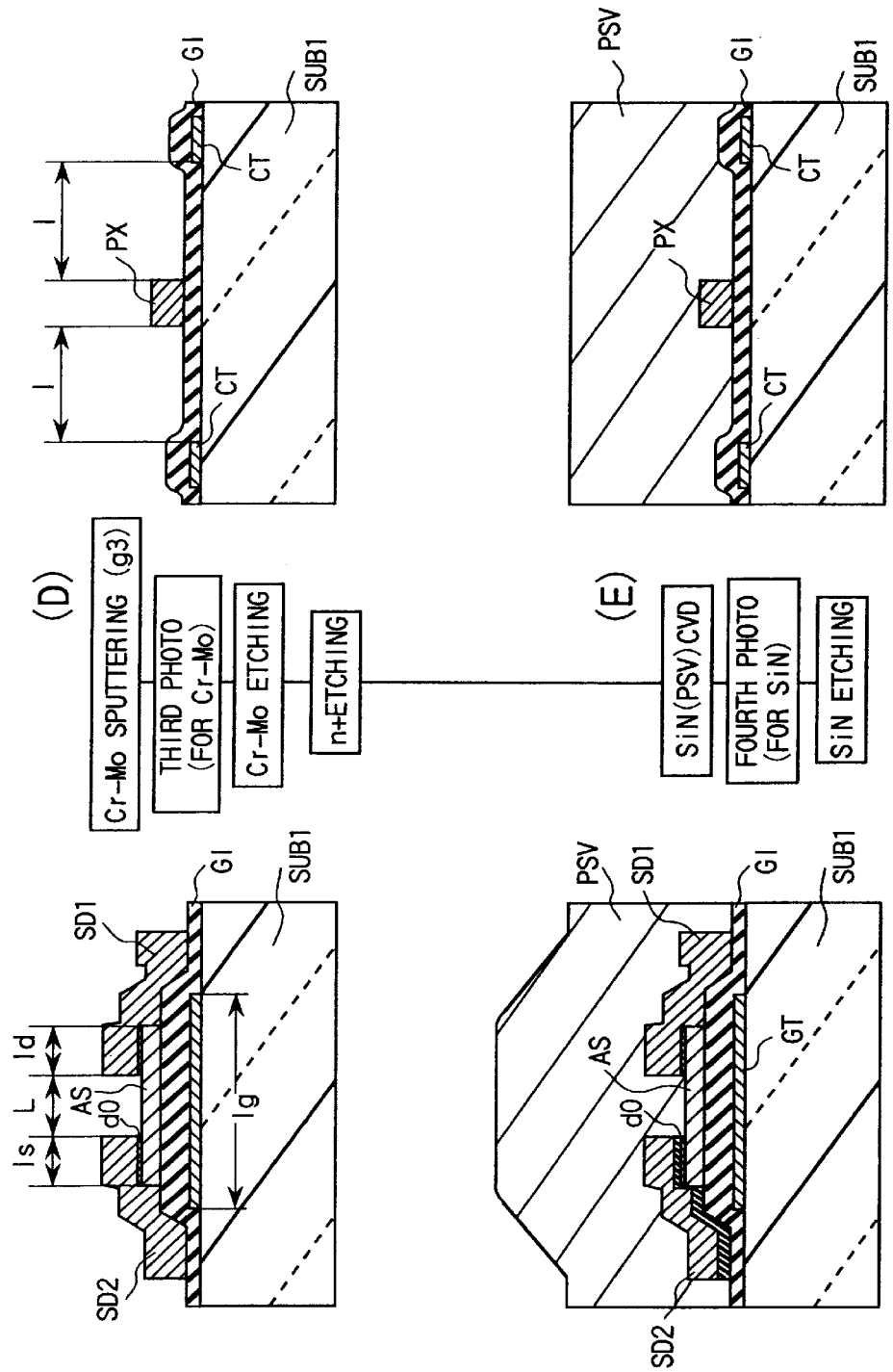
FIG. 15 is a part of the flow chart of FIG. 14 in a cross-sectional view for a pixel portion and a gate terminal portion showing manufacturing processes D to E on the substrate SUB1 side.
Figure 16:
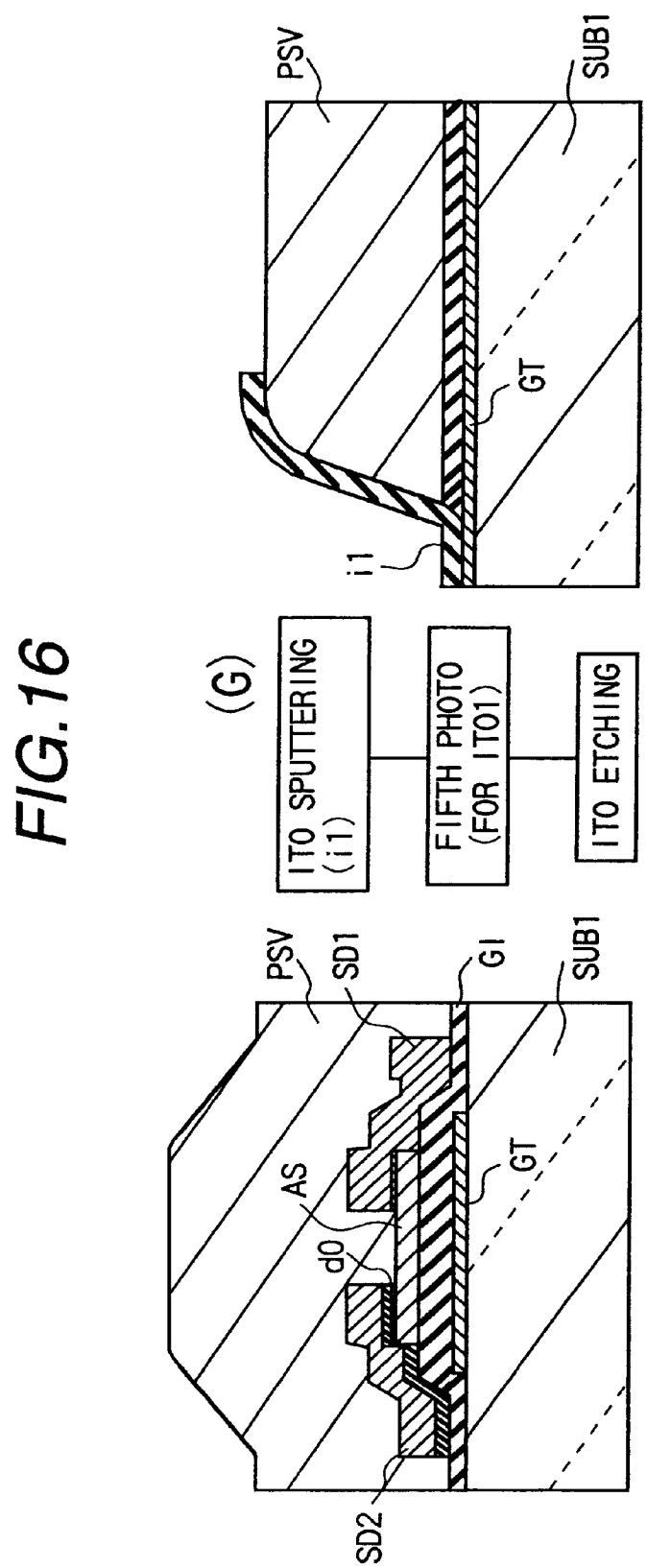
FIG. 16 is a part of the flow chart of FIG. 14 in a cross-sectional view for a pixel portion and a gate terminal portion showing manufacturing process G on the substrate SUB1 side.

With reference to FIGS. 14 to 16, the description will be made of a manufacturing process for an active matrix type LCD according to the present invention.

FIGS. 14 to 16 each show part of a process at the center, a cross-sectional view taken on line 7—7 of FIG. 1 in the TFT portion on the left side, and a cross-sectional view taken on line 6—6 of FIG. 1 on the right side.

As shown in FIGS. 14 to 16, an active matrix type LCD according to the present invention is manufactured by a plurality of processes (A) to (G). Processes (A) to (G), except for processes (B) and (D), are divided corresponding to each photographic process, and any cross-sectional view for each process shows a stage in which working occurs after the photographic process is finished and photo-resist was removed. The photographic process is, in this description, a series of operations from coating of photo-resist to development through selective exposure using a mask.

The process (A) will be described.

The process (A) is, as the first step, to provide a conductive film g3 having a film thickness of 2000 Å consisting of Cr—Mo and the like on the lower transparent glass substrate SUB1 consisting of AN635 glass (commercial name) by sputtering. After a photographic process for Cr—Mo in the second step, the conductive film g3 is selectively etched using dibasic cerium ammon nitrate. By this process, the gate electrode GT is formed in the TFT portion while the common electrode is formed in the pixel comb-teeth electrode portion. In this respect, in a place not shown, there is formed a bus line Shg, through which the gate signal line GL, the common voltage signal line CL, the gate terminal GTM, a first conductive layer of the common bus line CB1, a first conductive layer of the common electrode terminal CTM1, and the gate terminal GTM are connected.

The process (B) will be described.

In the process (B), ammonia gas, silane gas and nitrogen gas are introduced into a plasma CVD apparatus to provide a silicon nitride film having a film thickness of 3500 Å, silane gas and hydrogen gas are introduced into the plasma CVD apparatus to provide "i" type amorphous Silicon film having film thickness of 1200 Å, and thereafter, hydrogen gas and phosphine gas are introduced into the plasma CVD apparatus to provide a N(+) type amorphous Silicon film having a film thickness of 300 Å.

The process (C) will be described.

In the process (C), after a photographic process for a-Si, a N(+) type amorphous Silicon film or "i" type amorphous Silicon film is selectively etched using $SF_6$, CC14 as a dry etching gas to thereby form an island of an "i" type semiconductor layer AS.

The process (D) will be described.

In the process (D), in the first step, a conductive film d3 having film thickness of 300 Å consisting of Cr is provided by sputtering. After the photographic process for Cr—Mo is performed as the second step, in the third step, the conductive film d3 is etched using the same liquid as in the process (A) to thereby form a bus line SHd (not shown) which short-circuits the drain signal line DL, the source electrode SD1 (including stored capacity Cstg formation portion), the pixel electrode PX, the drain electrode SD2, the first conductive layer of the common bus line CB2 and the drain terminal DTM (these are patterned using the same photomask, and are collectively formed).

In the fourth step, CC14 and SF6 are introduced into a dry etching apparatus, and a N(+) type amorphous Silicon film is etched to thereby selectively remove the N(+) type semiconductor layer d0 between the source and drain. After the conductive film d3 is patterned with a mask pattern, the N(+) type semiconductor layer d0 is removed with the conductive film d3 serving as a mask. More specifically, as regards the N(+) type semiconductor layer d0 which has remained on the "i" type semiconductor layer AS, all portions other than the conductive film d1 and a conductive film d2 are removed by a self-align process. At this time, the N(+) type semiconductor layer d0 is etched so that all of its thickness portion is removed, and therefore, the surface portion of the "i" type semiconductor layer AS is also somewhat etched, but the degree of the etching can be controlled by the etching time.

The process (E) will be described.

In the first step of the process (E), ammonia gas, silane gas and nitrogen gas are introduced into a plasma CVD apparatus to provide a silicon nitride film having a film thickness of 0.4 $\mu$m. After performing a photographic process for SiN as the second step, the silicon nitride film is selectively etched using $SF_6$ as a dry etching gas in the third step, whereby the protective film PSV1 and the insulating film GI are patterned. The protective film PSV1 and the insulating film GI are patterned using the same photo-mask, and are collectively worked.

Figure 17:
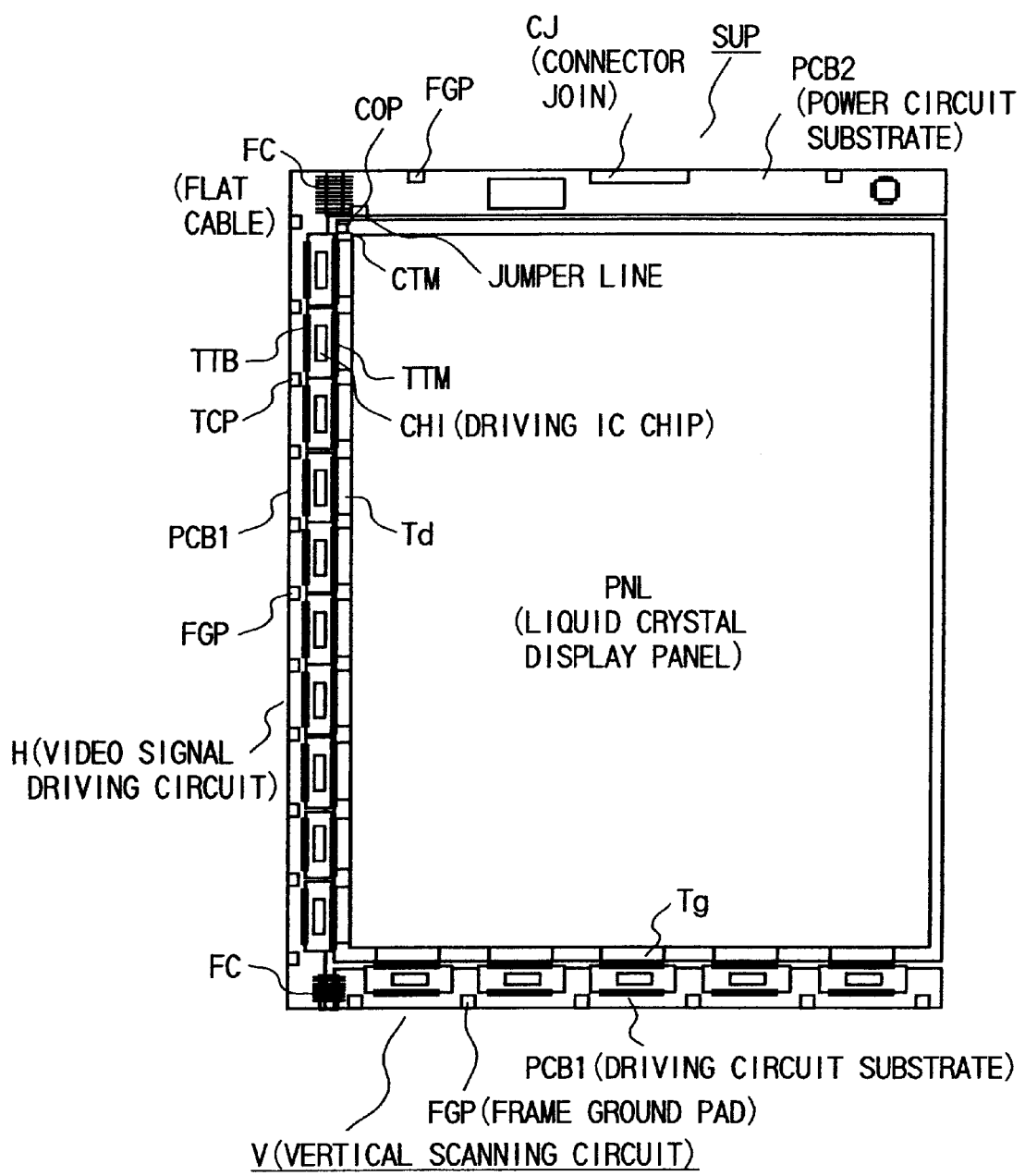
FIG. 17 is a top view showing a state in which a surrounding driving circuit is packaged on a LC display panel.

FIG. 17 is a top view showing a state in which a drain signal driving circuit H and a vertical scanning circuit V are connected to the display panel PNL shown in FIG. 7 and the like. CH1 designates a driving IC chip (lower five chips are driving IC chips on the vertical scanning circuit side, and ten chips each on the left side are driving IC chips on the drain signal driving circuit side) for driving the display panel PNL. TCP designates a tape carrier package comprising a driving IC chip CH1 packaged by the Tape Automated Bonding method (TAB), and PCB1 designates a driving circuit substrate on which the above-described TCP, a capacitor and the like are packaged, which is divided into two: for the drain signal driving circuit and for the gate signal driving circuit. FGP designates a frame ground pad, in which a spring-shaped fragment provided by cutting into a shield case SHD is soldered. FC designates flat cable through which the lower driving circuit substrate PCB1 and the left-side driving circuit substrate PCB1 are electrically connected. For the flat cable FC, there is used flat cable obtained by sandwiching plural lead wire (phosphor bronze material coated with Sn plating) between stripe-shaped polyethylene layer and polyvinyl alcohol layer and supporting as shown in FIG. 16.

FIG. 18 is an exploded perspective view showing each component of a LC display module MDL.

SHD designates a frame-shaped shield case (metal frame) consisting of a metallic plate; LCW denotes its display window; PNL denotes a LC display panel; SPB denotes a light diffusion board; LCB denotes a light guiding object; RM denotes a reflective plate; BL denotes a back-light fluorescent tube; and LCA denotes a back-light case, and each member is stacked in a vertical arrangement relationship as shown in FIG. 17 to constitute a module MDL.

The module MDL is adapted to be entirely fixed by claws and hooks provided for the shield case SHD.

The back-light case LCA has a shape to accommodate the back-light fluorescent tube BL, the light diffusion board SPB, the light guiding object LCB and the reflective plate RM, and light from the back-light fluorescent tube BL arranged on the side of the light guiding object LCB is made into uniform back light on the display surface by the light guiding object LCB, the reflective plate RM and the light diffusion board SPB to be emitted on the LC display panel PNL side.

An inverter circuit substrate PCB3 is connected to the back-light fluorescent tube BL as a power supply therefor.

In order to quantitatively measure display unevenness on a LC display element constituted in the present embodiment, a display surface was picked up (after gentle luminance shading over a wide range on the entire display surface, which is not recognized as display unevenness, is removed) with a CCD camera in a low luminance (10% relative luminance of the maximum luminance) display state, in which display unevenness is most conspicuous, to measure the contrast of the maximum luminance unevenness. As a result, the contrast was about 2%, and no display unevenness was recognized even in an image quality inspection by visual inspection, but a display with a high level of uniformity could be obtained.

Further, when comparing display luminance unevenness in a case where 10% relative luminance of the maximum luminance was displayed by causing the TFT to be normally on with the gate voltage of all pixels TFT in the above-described LCD at the threshold level or higher, with that in a case where the same entire display surface was displayed at the same luminance by temporally turning on/off the TFT in the same manner as in the actual state of use, the display luminance unevenness resulting from (disassembled after inspection, and the orientation film and the like on the surface of the TFT substrate are removed to observe and measure variations in electrode dimensions for confirmation) dimensional fluctuation in the electrode formation process of a TFT substrate could be confirmed even by visual inspection in the former display when the TFT was always on, whereas the display luminance unevenness could not be visually recognized in the latter normal driving lighting.

In the above-described comparison in measurement using the CCD camera, the contrast of the maximum luminance unevenness of the latter was reduced by 30% as compared with the former.

(Second Embodiment)

In the above-described first embodiment, the common voltage $V_{COM}$ to be applied to the common electrode CT is set to the AC voltage, which temporally varies between substantially two values in synchronism with variations in the drain signal voltage, and further the gate signal $V_G$ is adapted to take substantially four values in synchronism with variations in the above-described common voltage. Except for those features above-described, a LCD was manufactured in the same manner as in the first embodiment, and this was made into a second embodiment.

In order to exhibit the compensation effect for display unevenness caused by electrode dimensional fluctuation according to the present invention, the gate signal, which takes substantially four values, was adapted to selectively take either of two on-level values and either of two off-level values so that the falling width of the gate pulse at the time when the TFT is off becomes substantially the same between positive charging and negative charging periods in synchronism with the above-described AC-converted common voltage.

Since the maximum amplitude of the drain signal voltage could be reduced because of the above-described AC-converted common voltage, a circuit having a low withstand voltage was used for the drain signal driving circuit (signal-side driver).

As regards a LCD according to the second embodiment, when the contrast of the maximum luminance unevenness was measured as in the case of the first embodiment, it was about 1%, no display unevenness was seen even in the image quality inspection by visual inspection, but display with a high level of uniformity was obtained.

As in the case of the first embodiment, when comparing display luminance unevenness on the entire display surface in a case where 10% relative luminance of the maximum luminance was displayed by causing the TFT to be normally on with the gate voltage of all pixels TFT as the threshold or higher, with that in a case where the same entire display surface was displayed at the same luminance by temporally turning on/off the TFT in the same manner as in the actual state of use, the contrast of the maximum luminance unevenness in the latter was reduced to less than a half of that in the former in the comparison in a measurement using the CCD camera as in the case of the first embodiment.

FIRST COMPARATIVE EXAMPLE

In the above-described second embodiment, the structure is arranged such that the gate signal VG has substantially two values in synchronism with the variations in the common voltage only at the off-level, and has, at the on-level, substantially the same values during positive/negative charging to have substantially three values in total. Except for those features above-described, a LCD was manufactured in the same manner as in the second embodiment, and this was made into a first comparative example.

As in the case of the above-described first embodiment, when comparing display luminance unevenness in a case where 10% relative luminance of the maximum luminance was displayed on the entire display surface by causing the TFT to be normally on with the gate voltage of all pixels TFT at the threshold level or higher, with that in a case where the same entire display surface was displayed at the same luminance by temporally turning on/off the TFT in the same manner as in the actual state of use, any difference between both was hardly visually recognized, but display luminance unevenness resulting from dimensional fluctuation could be confirmed even by visual inspection for both.

Therefore, in the case of this comparative example using the gate signal having substantially three values, it is considered that in the low luminance display, in which the display unevenness is most conspicuous, the compensation effect for the display unevenness caused by electrode dimensional fluctuation according to the present invention is not exhibited.

When, as in the case of the first embodiment, the display surface of the LCD according to this first comparative example was picked up with a CDD camera to measure the contrast of the maximum luminance unevenness, the luminance unevenness reached as high a level as 12%, and display color unevenness resulting from fluctuation of the difference in thickness of the LC layer was conspicuous even in the visual inspection.

Also, even in the comparison in the measurements using a CCD camera, in the case where the all pixels TFT are caused to be normally on, and in the case of normal driving in which the TFT is temporally turned on/off, any difference was hardly recognized in the contrast between their maximum luminance unevenness.

The compensation effects in the above-described first and second embodiments and the first comparative example will be compared on the basis of the compensation condition equation (4) used in the description of the operation of the present invention.

Concretely, the compensation condition equation (4) will be evaluated with the following equation (transmission factor variation $\Delta T$ per unit one-side retreat amount Al standardized at an inclination $\alpha$ of luminance-voltage curve and video signal voltage $V'_{SIG}$) which has been deformed referring to the equations (1, 2).

$$\{1/(\alpha V'_{sig})\}(\Delta T/\Delta 1 = -(1/1\char`\^2)\{1+(\Delta C'gs/Ctot)+\{1/(1Ctot)\}(Cgsoff/1s+2Cgsoff/W+\Delta C'gs/1tot)=A+B$$

Here, A and B are defined as follows:

$$A=-(1/1\char`\^2)-\{\Delta C'gs/(1\char`\^2Ctot)\}$$

$$B=\{Cgsoff/1s1Ctot)\}+\{2Cgsoff/(W1Ctot)\}+(\Delta C'gs/(1tot1Ctot)\}$$

where A and B are components which contribute to effects for inter-pixel electrode gap fluctuation and TFT channel dimensional fluctuation with respect to the transmission factor fluctuation, respectively.

As regards a compensation ratio R (R=1 means perfect compensation, and minus means that influences of each fluctuation between pixel electrodes are increased conversely), which is defined with A and B, and R=−B/A, those obtained by calculating the compensation ratio R using design parameters in the first and second embodiments and the first comparative example are shown in Table 1.

As regards video signal voltage $V_{SIG}$ during common AC driving, it is set to $V_{SIG}=(\frac{1}{3}-\frac{1}{2})(V_{MAX}-V_{TH})$ which substantially corresponds to the relative transmission factor of 10%, at which it is said that the luminance unevenness is most conspicuous, and $\Delta C'gs=-(\frac{1}{4})Cgson-Cgsoff$ is used.

TABLE 1

Comparison of Compensation Effect between Embodiments and Comparative Example

| Item | Symbol(unit) | 1st embodiment | 2nd embodiment | First comparative example |
|---|---|---|---|---|
| Driving method | | Dot inversion (common fixed) | Full common AC (gate 4 value) | Common AC (gate 3 value) |
| Gap between pixel electrodes | $l(\mu m)$ | 13 | 11 | 11 |
| Pixel capacity | Clc(fF) | 35 | 31 | 31 |
| Stored capacity | Cstg(fF) | 150 | 160 | 160 |
| Stored capacity unit short side length | $l_{ATG}(\mu m)$ | 15 | 16 | 16 |
| Stored capacity unit aspect ratio | a | 2.5 | 3.7 | 3.7 |
| TFT channel width | $W(\mu m)$ | 10 | 28 | 28 |
| TFT channel length | $L(\mu m)$ | 6 | 7 | 7 |
| TFT source electrodes overlap | $l(\mu m)$ | 5 | 4 | 4 |
| ON-state g-s parasitic capacity | Cgson(fF) | 15 | 38 | 38 |
| OFF-state g-s parasitic capacity | Cgsoff(fF) | 8 | 8 | 8 |
| OFF-state total capacity | Ctot(fF) | 193 | 199 | 199 |
| Effective ON/OFF Difference in parasitic capacity | $\Delta C'gs(fF)$ | 7 | 30 | −17.5 |
| Total capacity fluctuation factor | $1/l_{Tot}(1/\mu m)$ | 0.176 | 0.155 | 0.155 |
| Pixel electrode Cause of interval fluctuation | −/(1*1) | −0.0059 | −0.0083 | −0.0083 |
| Above compensation item | $-\Delta C'gs/(1*1*Ctot)$ | −0.0002 | −0.0012 | 0.0007 |
| TFT channel length Cause of fluctuation | $Cgsoff/(1*l_s*Ctot)$ | 0.0006 | 0.0009 | 0.0009 |
| TFT channel width Cause of fluctuation | $2Cgsoff/(1*W*Ctot)$ | 0.0006 | 0.0003 | 0.0003 |
| Cause of total capacity fluctuation | $\Delta C'gs/(1*1tot*Ctot)$ | 0.0005 | 0.0021 | 0.0012 |
| Electrode interval fluctuation Cause total | A | −0.0051 | −0.0095 | −0.0075 |
| Driving voltage fluctuation Cause total | B | 0.0018 | 0.0033 | −6.2E-05 |
| Compensation ratio | R = −B/A | 0.29 | 0.35 | −0.008 |

From the above-described Table 1, it can be seen that as described in detail in the operation of the present invention, the compensation ratios in the first embodiment using dot inversion driving with common fixed, and in the second embodiment using full common AC driving in which a 4-value gate pulse is used are 0.29 and 0.35, respectively, that about 30% of luminance fluctuation resulting from pixel electrode interval fluctuation is estimated to be compensated for by effective driving voltage fluctuation caused by dimensional fluctuations in TFT and the stored capacity formation portion which simultaneously occur, and that they considerably meet the evaluation result for each of the above-described embodiments.

On the other hand, in the case of the first comparative example using the common AC driving based on the 3-value gate pulse which is normally used in most cases, the effective driving voltage fluctuation has a negative value, although slightly, and the effects of dimensional fluctuations in the TFT and the storage capacity formation portion are exhibited in a direction to increase the luminance fluctuation caused by the pixel electrode interval fluctuation. Therefore, it can be seen that the electrode dimensional fluctuation appears as display luminance unevenness as it is.

As described above in detail, according to the present invention, it is possible to provide an active matrix type LCD using a horizontal electric field system, which hardly generates display unevenness incident to electrode dimensional fluctuation caused by variations resulting from the electrode formation process, and is excellent in mass producibility in high image quality.

What is claimed is:

1. An active matrix type liquid crystal display having a plurality of active elements, which are provided with a pair of substrates, at least one of which is transparent, and a liquid crystal layer pinched between said pair of substrates,
one of said pair of substrates
having a pixel electrode and a common electrode which are arranged at different phases by extending an electric field actually parallel to said substrate surface in the same direction as a signal electrode on said substrate in order to apply it to said liquid crystal layer, said pixel electrode having a first connecting portion which extends in a scanning electrode direction and to which at least two pixel electrodes are connected, said common electrode having a second connecting portion which extends in the scanning electrode direction and to which a plurality of common electrodes are connected, said first connecting portion and said second connecting portion being superimposed on each other to form a capacity formation portion, said liquid crystal display being constituted such that there arises a correlation between variations in said active element dimension and finish dimension of said capacity formation portion, and variations in finish dimension of said pixel electrode or said common electrode.

2. An active matrix type liquid crystal display according to claim 1, wherein variations in effective driving voltage caused by variations in said active element dimension and finish dimension of said capacity formation portion, act in a direction to compensate for variations in the optical quality caused by variations in finish dimension of said pixel electrode or said common electrode.

3. An active matrix type liquid crystal display having a pair of substrates, at least one of which is transparent, a liquid crystal layer disposed between said substrates and a plurality of active elements, one of said pair of substrates having a pixel electrode and a common electrode which are arranged at different phases by extending an electric field actually parallel to said substrate surface in the same direction as a signal electrode on said substrate in order to apply it to said liquid crystal layer, said pixel electrode having a first connecting portion which extends in a scanning electrode direction and to which at least two pixel electrodes are connected, said common electrode having a second connecting portion which extends in the scanning electrode direction and to which a plurality of common electrodes are connected, said first connecting portion and said second connecting portion being superimposed on each other to form a capacity formation portion, said active elements arid said pixel electrode or common electrode being patterned by the same photo-mask, and the electrode potential at said pixel electrode or said common electrode being normally a substantially fixed value.

4. An active matrix type liquid crystal display having a pair of substrates, at least one of which is transparent, a liquid crystal layer disposed between said substrates and a plurality of active elements, one of said pair of substrates having a pixel electrode and a common electrode which are arranged at different phase by extending an electric field actually parallel to said substrate surface in the same direction as a signal electrode on said substrate in order to apply it to said liquid crystal layer, said pixel electrode having a first connecting portion which extends in a scanning electrode direction and to which at least two pixel electrodes are connected, said common electrode having a second connecting portion which extends in the scanning electrode direction and to which a plurality of common electrodes are connected, said first connecting portion and said second connecting portion being superimposed on each other to form a capacity formation portion, at least one substrate of said pair of substrates having optical means for changing the optical quality in response to a molecule orientation state of said liquid crystal layer, said active elements and said pixel electrode or common electrode being formed in the same layer within said substrate surface, the electrode potential of at least one of a pair of electrodes for applying an electric field substantially parallel to the substrate surface to said liquid crystal layer temporally varying between substantially two values, and the signal voltage wave-form for turning on/off said active elements temporally varying between substantially four values.

5. An active matrix type liquid crystal display according to claim 4, wherein said active elements and said pixel electrode or said common electrode were patterned by the same photo-mask.

6. An active matrix type liquid crystal display, comprising a pair of substrates, at least one of which is transparent, a liquid crystal layer disposed between said substrates and a plurality of active elements, one of said pair of substrates having comb-teeth-shaped electrodes for applying an electric field substantially parallel to said substrate surface to said liquid crystal layer, and a capacity formation portion formed between a part of these electrodes, being formed such that variations in said active element dimension and finish dimension of said capacity formation portion, and variations in finish dimension of at least one of said comb-teeth-shaped electrodes occur simultaneously, and variations in effective driving voltage caused by variations in said active element dimension and finish dimension of said stored capacity formation portion, acting in a direction to compensate for variations in the optical quality caused by variations in finish dimension of at least one of a pair of electrodes for applying an electric field substantially parallel to the substrate surface to said liquid crystal layer.

7. An active matrix type liquid crystal display, comprising a pair of substrates, at least one of which is transparent, a liquid crystal layer disposed between said substrates and a plurality of active elements, one of said pair of substrates having comb-teeth-shaped electrodes for applying an electric field substantially parallel to said substrate surface to said LC layer, and a capacity formation portion formed between a part of these electrodes, at least one of said active elements, said stored capacity formation portion, and at least one of said comb-teeth-shaped electrodes being patterned using the same photo-mask in accordance with the photo process, and the electrode potential of at least one of a pair of electrodes for applying an electric field substantially parallel to the substrate surface, to said liquid crystal layer being normally a substantially fixed value.

8. An active matrix type liquid crystal display, comprising two or more groups, each of which consists of: a pair of substrates, at least one of which is transparent; a liquid crystal layer disposed between said substrates; and at least a pair of electrodes, formed on one of said pair of substrates, for applying, to said liquid crystal layer, an electric field substantially parallel to the substrate surface, and further comprising: a plurality of active elements connected to these electrodes; a storage capacity connected to these active elements; and optical means formed on at least one of said pair of substrates, for changing the optical quality in response to a molecule orientation state of said liquid crystal layer, at least one electrode of said active elements, said storage capacity formation portion, and at least one of a pair of electrodes for applying, to said liquid crystal layer, an electric field substantially parallel to the substrate surface being formed in the same layer within the substrate surface so that the electrode potential of at least one of said pair of electrodes temporally varies between substantially two values, and the signal voltage wave-form for turning on/off said active elements temporally varying between substantially four values.

9. An active matrix type liquid crystal display according to any of claims 6 to 8, wherein at least one electrode of said active elements, said stored capacity formation portion, and at least one of a pair of electrodes for applying, to said liquid crystal layer, an electric field substantially parallel to the substrate surface are patterned using the same photo-mask in accordance with the photo-process.

10. An active matrix type liquid crystal display according to any of claims 6 to 8, wherein in a case where the same display is performed with all pixels consisting of said two or more groups of electrodes, the variation width for variations in the optical quality on the entire display surface is smaller in the display by temporally turning on/off said active elements than in the display by causing said active elements to be normally on.

11. An active matrix type liquid crystal display according to claim 6, wherein in a case where the same display is performed with all pixels consisting of said two or more groups of electrodes, as regards the variation width for variations in the optical quality on the entire display surface, a reduction ratio in the variation width in the display by temporally turning on/off said active elements to that in the display by causing said active elements to be normally on exceeds 20%.

* * * * *